US012017664B2

(12) United States Patent
Vedantam et al.

(10) Patent No.: US 12,017,664 B2
(45) Date of Patent: Jun. 25, 2024

(54) SYSTEM AND METHOD FOR MANAGING OPERATIONS AND ASSETS IN A MULTI-ENTITY ENVIRONMENT

(71) Applicant: TRACKIT SOLUTIONS FZ LLC, Dubai (AE)

(72) Inventors: Somasekhar Vedantam, Dubai (AE); Husain Badriuddin Ragib, Dubai (AE); Vijaikumar Nair, Dubai (AE)

(73) Assignee: TRACKIT SOLUTIONS FZ LLC ( * ) Notice: Subject to any disclaimer, the term of this patent is extended or adjusted under 35 U.S.C. 154(b) by 801 days.

(21) Appl. No.: 17/177,215

(22) Filed: Feb. 17, 2021

(65) Prior Publication Data
US 2022/0258748 A1    Aug. 18, 2022

(51) Int. Cl.
B60W 50/02 (2012.01)
G07C 5/00 (2006.01)
G07C 5/08 (2006.01)
G08G 1/00 (2006.01)
(Continued)

(52) U.S. Cl.
CPC ............ B60W 50/02 (2013.01); G07C 5/008 (2013.01); G07C 5/0841 (2013.01); G08G 1/20 (2013.01); H04W 4/029 (2018.02); H04W 84/18 (2013.01)

(58) Field of Classification Search
None
See application file for complete search history.

(56) References Cited

U.S. PATENT DOCUMENTS 7,082,379 B1 * 7/2006 Bickford ............ G05B 23/0254
                                                               700/30
9,224,249 B2    12/2015 Lowrey et al.
9,472,030 B2    10/2016 Davidson et al.
(Continued)

FOREIGN PATENT DOCUMENTS

WO    WO-2007047359 A2 *  4/2007  ............. G06Q 10/06
WO    WO-2008025622 A1 *  3/2008  ............. G05B 15/02

OTHER PUBLICATIONS

A. de la Fuente et al "Advanced Techniques for Assets Maintenance Management", Dec. 2018, IFAC—PapersOnLine vol. 51, Issue 11, 2018, pp. 205-210 (Year: 2018).*

(Continued)

Primary Examiner — Romain Jeanty
(74) Attorney, Agent, or Firm — Joy S. Goudie

(57) ABSTRACT

A system including a tracking device, sensors, and an operations management engine (OME), and a method for managing operations and assets, for example, motorized and non-motorized equipment, associated with multiple entities, are provided. The OME dynamically receives asset data from the tracking device and operating parameters of the assets from one or more sensors in real time. The OME dynamically determines multiple data elements, for example, location, asset status, operating status, asset proximity to asset requirement, etc., associated with each asset by processing logical combinations of the asset data and the operating parameters, based on which the OME determines actions associated with the assets to be executed. The OME generates an interactive, graphical map interface that renders a visual representation of the assets, a geography containing the assets, associated operations, and the data elements in real time for real-time monitoring and facilitating execution of the actions.

38 Claims, 24 Drawing Sheets

(51) Int. Cl.
*H04W 4/029* (2018.01)
*H04W 84/18* (2009.01)

(56) References Cited

U.S. PATENT DOCUMENTS

| | | |
|---|---|---|
| 2002/0065698 A1 | 5/2002 | Schick et al. |
| 2003/0069648 A1 | 4/2003 | Douglas et al. |
| 2013/0030876 A1* | 1/2013 | Rinehart ............ G06Q 10/0637 |
| | | 705/7.38 |
| 2016/0284185 A1 | 9/2016 | Maison et al. |
| 2018/0314229 A1* | 11/2018 | Biazetti .................. G06F 30/00 |
| 2020/0150634 A1* | 5/2020 | Gray ................ G05B 19/41835 |

OTHER PUBLICATIONS

Avro Tracker, Aircraft Support Equipment and GSE Fleet Tracking, avrogse.com.

Transpoco Telematics, AI Collision management, making your drivers safer and more efficient, transpoco.com.

\* cited by examiner

| Resource Type | Count | Time at aircraft stand | | Comments |
|---|---|---|---|---|
| | | Required at | Required till | |
| Passenger Step | 1 or 2 | A | D - 2 minutes | Count dependent on aircraft parking stand If remote stand, then 2 If contact stand, then 1 |
| Baggage Conveyor Belt | 2 | A + 2 minutes | Till all bags are loaded in hold | |
| Lower Deck Loader | 2 | A | D -2 | |
| Baggage Tractors | 2 to 4 | During turnaround time duration | | Dependent on baggage load |
| Passenger Coaches @ Arrival | 2 to 3 | A | Till all pax disembarked | If aircraft is on contact stand, then coaches are not needed |
| Air-Conditioning Unit | 1 | A | D-2 | If aircraft is on contact stand and stand has provision for pre-conditioned air, this equipment is not needed |
| Ground Power Unit | 1 | A | D-2 | If aircraft is on contact stand and stand has provision for 400Hz/110V C power, this equipment is not needed |
| Water Service Unit | 1 | Any time with turnaround duration | | Generally required for less than 10 minutes |
| Toilet Service Unit | 1 | Any time with turnaround duration | | Generally required for less than 10 minutes |
| Air Start Unit | 1 | D - 3 | D - 1 | Based on request by airline |
| Pushback Tractor | 1 | D - 10 | D + 10 | |
| *A = Arrival time. D = Departure time* | | | | |

FIG. 5

| Type of maintenance check | To be performed at Engine hour reading |
|---|---|
| A Check | 500 hours |
| B Check | 1000 hours |
| C Check | 2000 hours |
| D Check | 3000 hours |

FIG. 6A

| Date of last planned maintenance | Engine hours @ last planned maintenance | Type of check done | Maintenance interval engine hours |
|---|---|---|---|
| 01/12/2020 | 1,075 | B Check | 500 |

FIG. 6B

| Engine Hour Reading | 500 hours | 1000 hours | 1500 hours | 2000 hours | 2500 hours | 3000 hours |
|---|---|---|---|---|---|---|
| Maintenance Check | A Check | B Check | A Check | C Check | A Check | D Check |

FIG. 6C

| Average daily engine hours | # of days to go for next maintenance | Next maintenance due on |
|---|---|---|
| 8 | 62.50 | 01/02/2021 |
| 10 | 50.00 | 20/01/2021 |
| 12 | 41.67 | 11/01/2021 |
| 14 | 35.71 | 05/01/2021 |

FIG. 6D

| GSE# | Type | Operator | Flight | ENG | OPS | LOP | HCT | BAT | ACC | BKE | FUEL | LOC | Speed | MAINT |
|---|---|---|---|---|---|---|---|---|---|---|---|---|---|---|
| GPU 001 | GPU | UNKNOWN | | ○ | ○ | ○ | ● | ○ | ○ | ○ | 100 | Cargo Terminal | 0 km/h | |
| MCB 010 | MCB | UNKNOWN | AH4015 - AH40... | ○ | ○ | ○ | ● | ○ | ○ | ○ | 80 | Unknown | 0 km/h | |
| MCB 012 | MCB | UNKNOWN | AH4015 - AH40... | | ○ | ○ | ○ | ○ | ○ | ○ | 40 | GSE Parking - N | 0 km/h | |
| PBT 001 | PBT | UNKNOWN | | | ○ | ○ | ○ | ○ | ○ | ○ | 90 | Cargo Terminal | | |
| TTR 012 | TTR | UNKNOWN | | | ○ | ○ | ○ | ○ | ○ | ○ | 60 | Cargo Terminal | | |
| TTR 013 | TTR | UNKNOWN | AH4014 | | ○ | ○ | ○ | ○ | ○ | ○ | 70 | Unknown | 0 km/h | |

FIG. 8

GSE Dashboard

Baggage Tractor
66% - 21 Available

| 6 | 3 | 11 |
|---|---|---|
| IN USE | MAINTENANCE | OVERDUE |

Maintenance in 50h - No

Conveyor Belt
80% - 8 Available

| 1 | 0 | 2 |
|---|---|---|
| IN USE | MAINTENANCE | OVERDUE |

Maintenance in 50h - No

Ground Power Units
100% - 3 Available

| 0 | 0 | No |
|---|---|---|
| IN USE | MAINTENANCE | OVERDUE |

Maintenance in 50h - No

Lower Deck Loaders
88% - 7 Available

| 0 | 0 | 3 |
|---|---|---|
| IN USE | MAINTENANCE | OVERDUE |

Average Hrs/Day - 10
Maintenance in 50h - 1

Push Back
50% - 3 Available

| 1 | 0 | 1 |
|---|---|---|
| IN USE | MAINTENANCE | OVERDUE |

Maintenance in 50h - No

Support Services
100% - 10 Available

| 0 | 0 | No |
|---|---|---|
| IN USE | MAINTENANCE | OVERDUE |

Maintenance in 50h - No

| GSE Type | High Utilization Units (> by 25% of average) | | | Low Utilization Units (> by 75% of average) | | |
|---|---|---|---|---|---|---|
|  | Jan | Feb | Mar | Jan | Feb | Mar |
| LDL |  |  |  |  |  |  |
| MCB |  |  |  |  |  |  |
| TTR |  |  |  |  |  |  |
| PBT |  |  |  |  |  |  |
| TBL |  |  |  |  |  |  |

SYSTEM AND METHOD FOR MANAGING OPERATIONS AND ASSETS IN A MULTI-ENTITY ENVIRONMENT

BACKGROUND

Technical Field

The embodiments herein, in general, relate to managing assets. More particularly, the embodiments herein relate to managing operations, for example, ground handling operations, and monitoring, tracking, and managing assets, for example, motorized equipment, non-motorized equipment, machine assets, mobile assets, etc., associated with multiple entities, in tandem.

Description of the Related Art

Large industrial operations, for example, airport operations, ground handling operations, etc., require the integration and coordination of multiple assets such as vehicles, equipment, systems, etc., into complex systems and/or methods of operation. Ground handling operations comprise a wide range of operations associated with servicing an asset, for example, an aircraft, while the asset in on the ground and parked at a terminal gate of an airport. To optimize management of these assets, there is a need for appropriate control and use of these assets and availability of accurate and reliable information about these assets. The information of the assets is typically incomplete, inaccurate, and not readily available in real time. A typical airport environment comprises multiple assets such as vehicles and equipment in use and requiring management. These vehicles and equipment are associated with multiple entities, also referred to as "stakeholders", for example, an airport authority, an airport operator, ground handling companies, airlines, catering companies, safety and security agencies, contractors, etc., operating within the airport environment. For example, an airport authority and an airport operator operate assets such as light motor vehicles, runway cleaning equipment, friction testers, road sweepers, etc.; the airport operator also operates maintenance equipment such as scissor lifts, steps, etc.; ground handling companies and airlines operate assets such as motorized ground support equipment (GSE), non-motorized GSE, passenger coaches, and maintenance equipment such as scissor lifts, steps, etc.; the airlines also operate maintenance equipment such as trestles, jacks, etc.; catering companies operate assets such as catering hi-loaders, refrigerated vehicles, etc.; safety and security agencies operate assets such as ambulances, firefighting equipment, emergency response vehicles, etc., and contractors operate assets such as light motor vehicles, maintenance equipment such as scissor lifts, steps, etc., construction equipment, etc.

The fleet size of each stakeholder for each asset type varies significantly based on the size of the airport, geographical location of the airport, flight and passenger volumes handled, peak operational period, and flight volumes handled during the peak, nature of the activity in which the stakeholder is engaged, and classification of the airport as a hub or a spoke. While all stakeholders within the airport have a common goal of ensuring a safe on-time performance, each stakeholder has to manage different operational parameters. Many stakeholders purchase more assets than would be needed to optimize the use of each asset. Most often, assets are moved, mislocated, damaged, or lost, without being tracked. Frequently, assets are under-utilized and poorly maintained. Therefore, managing the operations on the ground is challenging and further compounded, without cohesion, information exchange, and visibility of the asset deployed.

Speed, efficiency, and accuracy are required in ground handling operations to minimize the turnaround time. Some of the challenges in managing the ground handling operations comprise a lack of location awareness, that is, the locations of the assets are not available in real time; engine and operating status of the assets are not known in real time; scheduled servicing for maintenance is mostly based on calendar days and not driven by asset utilization; data-driven actual utilization pattern is not available to right size a fleet and optimize operations; safety monitoring is driven by policies and processes; actual information on best-fit equipment for tasks is not available to optimize a planned allocation process; equipment health monitoring is dependent on operator awareness and reporting; equipment refueling is a reactive process depending on operator and/or attendant inspections; a single source of information of all assets is not available; and a lack of real-time information on traffic patterns on an airport apron, that is, the area of an airport where assets are parked, unloaded or loaded, refilled, or boarded.

To overcome the above-recited challenges, stakeholders need to ensure consistent service delivery standards to torn around an aircraft safely in the shortest amount of time; reduce operating and maintenance costs to deliver highest benefit/cost ratio that is shared between stakeholders; and implement technology-driven solutions to optimally utilize capital-intensive assets such as ground support equipment. Moreover, there is a need for information availability for long term decision making on optimal fleet size and equipment allocation processes. Furthermore, there is a need for a single source of information about all the assets for visualizing and managing day of operations, thereby offering visibility on equipment operating status, reducing congestion on airport roads, optimizing fleet size, and ensuring safety of human resources, equipment, and the aircraft. Furthermore, there is a need for a single platform for monitoring both motorized or powered and non-motorized or non-powered equipment without the need for deployment of any additional infrastructure on the airport apron.

Hence, there is a long-felt need for a system and a method for managing operations and monitoring, tracking, and managing assets, for example, motorized equipment, non-motorized equipment, machine assets, mobile assets, etc., associated with multiple entities, in tandem, while addressing the above-recited needs.

SUMMARY

This summary is provided to introduce a selection of concepts in a simplified form that are further disclosed in the detailed description. This summary is not intended to determine the scope of the claimed subject matter.

The embodiments herein address the above-recited needs for a system and a method for managing operations, for example, ground handling operations, and monitoring, tracking, and managing multiple assets, for example, motorized equipment, non-motorized equipment, machine assets, mobile assets, etc., associated with multiple entities, in tandem. In a multi-entity environment, for example, an airport environment, the embodiments herein ensure consistent service delivery standards to turn around an aircraft safely in the shortest amount of time; reduce operating and maintenance costs to deliver highest benefit/cost ratio that is shared between entities or stakeholders; and implement technology-driven solutions to optimally utilize capital-intensive assets such as ground support equipment. Moreover, the embodiments herein provide a single source of information about all the assets for visualizing and managing day of operations, thereby offering visibility on equipment operating status, reducing congestion on airport roads, optimizing fleet size, and ensuring safety of human resources, equipment, and the aircraft. Furthermore, the embodiments herein ensure information availability for long term decision making on optimal fleet size and equipment allocation processes. Furthermore, the embodiments herein provide a single platform for monitoring both motorized or powered and non-motorized or non-powered equipment without the need for deployment of any additional infrastructure on an airport apron.

The system disclosed herein comprises a tracking device, a plurality of sensors, and an operations management engine. The tracking device is operably coupled to each of a plurality of assets comprising, for example, motorized equipment, non-motorized equipment, machine assets, and mobile assets. The tracking device is configured to collect asset data from each of the assets. In an embodiment, the tracking device is a tracking and telematics device operably coupled to the motorized equipment. In another embodiment, the tracking device is a wireless beacon tag attached to the non-motorized equipment. The wireless beacon tag is configured to be read by a tag reader for retrieving location data of the non-motorized equipment. One or more of the sensors are operably coupled to one or more of the assets for measuring and monitoring a plurality of operating parameters of the asset(s) in real time. The sensors comprise, for example, fuel level sensors, temperature sensors, tyre pressure sensors, proximity detection systems, impact sensors, camera systems, etc. The camera systems are configured to continuously capture images of an environment around each of the assets for incident investigation, process audits, and an analysis of training needs. The operating parameters measured and monitored by the sensors comprise, for example, (a) fuel level of the motorized equipment; (b) temperature of the assets; (c) tyre pressure of one or more of the assets; (d) proximity of the assets to external objects; (e) damage to the assets; etc. In an embodiment, the system disclosed herein further comprises a plurality of access control devices in operable communication with the operations management engine for providing authorized access to the assets. The access control devices are configured to communicate with the operations management engine via a plurality of communication protocols for authorizing the access to the assets and facilitating behavior monitoring, audit logging, and investigation actions.

The operations management engine is configured to define computer program instructions executable by at least one processor. The processor(s) is in operable communication with the tracking device and the sensors. The operations management engine dynamically receives the asset data from the tracking device and the operating parameters from the sensor(s). The operations management engine dynamically determines a plurality of data elements of each of the assets by processing logical combinations of the asset data and the operating parameters. The data elements comprise, for example, location, asset status, operating status, operational capability, availability, asset proximity to asset requirement, health, fuel level, speed of movement, machine asset hours, utilization pattern, operator behavior, etc., associated with each of the assets. The asset status comprises, for example, a power on/off status of each of the assets. The operating status comprises one or more of availability, drive status, work status, standby status, and service status of each of the assets.

The operations management engine determines actions associated with the assets to be executed based on the determined data elements by performing one or more of the following. The operations management engine identifies optimal assets from among the plurality of assets to be allocated for tasks associated with the operations. The operations management engine identifies value-added machine asset hours and non-value-added machine asset hours for reducing fuel consumption and maintenance costs while extending warranty periods. The operations management engine identifies the location of any of the assets requiring refueling based on the fuel level of the corresponding asset, and in communication with a fuel management system, facilitates a proactive refueling operation to the identified location. The operations management engine, in communication with a maintenance management system, forecasts preventive maintenance intervals and executes maintenance planning and scheduling using the machine asset hours and the utilization pattern of each of the assets. The operations management engine determines a maximum number of assets needed and used during peak operational periods for determining a fleet size needed to meet operational requirements.

In an embodiment, the operations management engine forecasts a type and a count of each of the assets required to handle each of the operations along with a duration of engagement, a start time of the engagement, and an end time of the engagement using schedules, engagement standards, and a compatibility matrix defining machine types that each of the assets is configured to service. In another embodiment, the operations management engine compares an actual deployment of each of the assets with a forecasted and planned allocation of each of the assets for each of the operations and generates a report highlighting variations resulting from the comparison for executing corrective actions. In another embodiment, the operations management engine executes turnaround monitoring for confirming presence of each of the assets allocated for each of the operations at a required operational area at a required time and for confirming completion of the operations for the entities. In another embodiment, the operations management engine creates and manages geofences in an environment around each of the assets, in communication with the access control devices and the tracking device, to preclude unauthorized assets from entering the environment and to preclude unauthorized movement of the assets within the environment. In another embodiment, the operations management engine, in communication with the fuel management system, automatically acquires fueling data comprising quantity of fuel dispensed to any of the assets and manages financial transactions associated with the fueling data. In another embodiment, the operations management engine triggers alerts associated with the data elements and the assets for notifying the entities to initiate proactive mitigation and recovery actions. In another embodiment, the operations management engine, in communication with a billing management system, electronically acquires and processes billing information for operations external to standard service-level agreements.

The operations management engine generates an interactive graphical map interface configured to render a visual representation of the assets, a geography containing the assets, the operations associated with the assets, and the determined data elements in one or more of a plurality of visual configurations in real time for real-rime monitoring and facilitating execution of the determined actions associated with the assets. The visual representation rendered on the interactive, graphical map interface is configured to perform at least one of: (a) displaying detailed information on the data elements of each of the assets; (b) allowing measurement of distance; (c) displaying geographic coordinates; (d) capturing and displaying routes used by the assets; (e) triggering playback of the visual representation; (f) configuring geofences for executing geofencing; (g) flagging discrepancies and issues correlated to the location of each of the assets for facilitating proactive recovery actions; (h) performing selective assignment actions; (i) performing historical data analysis; (j) displaying real-time information on traffic patterns on roads to be travelled by the assets; and (k) displaying day of operations, role-specific dashboards. The visual configurations in which the visual representation of the assets, the geography containing the assets, the operations associated with the assets, and the determined data elements are rendered comprise configurations, for example, by one or more of flight, gate, geofence locations, airline, asset type, fuel level, health status, asset identifier, individual assets, asset status, operating status, location, department, operator, ad hoc service provision, violations, operator behavior, faults, and maintenance. In an embodiment, the assets and the determined data elements are rendered on the interactive, graphical map interface using predefined color-coded interface elements representative of monitored functions and statuses. In an embodiment, the interactive, graphical map interface is deployable on a user device and configurable based on user roles and allocation of the assets for monitoring the assets in real time and initiating corrective actions on the assets.

In an embodiment, the operations management engine is configured to interface with a plurality of operational systems to render supplementary information associated with the assets on the interactive, graphical map interface. The operational systems comprise, for example, an operations database, resource management systems, contracts and billing systems, a training and operator licensing system, etc. In an embodiment, the operations management engine generates reports with key performance indicators, for example, on one or more of operator performance, operator behavior, the actions performed, operator productivity, and compliance to standards. The embodiments herein provide enhanced transparency of all processes reliant on deployment of assets such as ground support equipment and mobile assets, while also offering complete visibility of all assets used by various entities or stakeholders on a single platform.

In one or more embodiments, related systems comprise circuitry and/or programming for executing the methods disclosed herein. The circuitry and/or programming are any combination of hardware, software, and/or firmware configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the embodiments herein, exemplary constructions of the embodiments are shown in the drawings. However, the embodiments herein are not limited to the specific methods and components disclosed herein. The description of a method step or a component referenced by a numeral in a drawing is applicable to the description of that method step or component shown by that same numeral in any subsequent drawing herein.

FIG. 5 exemplarily illustrates a tabular representations of data elements determined by the operations management engine for determining actions associated with assets to be executed, according to an embodiment herein.

FIGS. 6A-6D exemplarily illustrate tabular representations of data elements determined by the operations management engine for forecasting dates for a next due maintenance, according to an embodiment herein.

FIG. 8 exemplarily illustrates a screenshot of a graphical user interface rendered by the operations management engine for real-time monitoring of multiple data elements determined by the operations management engine, according to an embodiment herein.

FIGS. 9A-9G exemplarily illustrate screenshots of dashboards rendered by the operations management engine for monitoring, tracking, and managing assets associated with multiple entities, according to an embodiment herein.

The specific features of the embodiments herein are shown in some drawings and not in others for convenience only as each feature may be combined with any or all of the other features in accordance with the embodiments herein.

DETAILED DESCRIPTION

Various aspects of the present disclosure may be embodied as a system, a method, or a non-transitory, computer-readable storage medium having one or more computer-readable program codes stored thereon. Accordingly, various embodiments of the present disclosure may take the form of an entirely hardware embodiment, an entirely software embodiment comprising, for example, microcode, firmware, software, etc., or an embodiment combining software and hardware aspects that may be referred to herein as a "system", a "module", an "engine", a "circuit", or a "unit". Various embodiments herein provide a method, a system, and subsystems that implement an operations management engine for managing operations and assets in a multi-entity environment. As used herein, "multi-entity environment" refers to an environment where multiple entities, for example, an airport authority, an airport operator, around handling companies, airlines, catering companies, safety and security agencies, contractors, etc., operate and require optimal management of different assets. For purposes of illustration, the detailed description refers to management of operations and assets in an airport environment, for example, ground handling operations; however, the scope of the embodiments herein is not limited to management of operations and assets in an airport environment, but may be extended to include management of large industrial operations and assets in different industrial environments.

Also, as used herein, the term "asset" refers to motorized or powered equipment, non-motorized or non-powered equipment, machine assets, and mobile assets. In an embodiment, the motorized and non-motorized equipment refer to ground support equipment (GSE) used in ground handling operations. Also, as used herein, the term "machine asset" refers to parts and components that constitute a high value machine or that are associated with the high value machine, and that are susceptible to wear and failure over time. For example, machine assets comprise vehicle engines, industrial gas turbine engines, landing gear, auxiliary power units (APUs), wheels and brakes, etc., associated with high value machines such as defence vehicles, trains, airplanes, marine vessels, or other high value vehicles. In an embodiment, the machine asset is a high value machine such as an aircraft. The mobile assets comprise, for example, vehicles such as fuel trucks, tractors, etc., passenger coaches, catering hi-loaders, etc. The overall system disclosed herein comprises the operations management engine, tracking devices, sensors, access control devices, tag readers, and associated hardware, middleware, software, devices, and network components for managing operations and assets associated with multiple entities.

Figure 1:
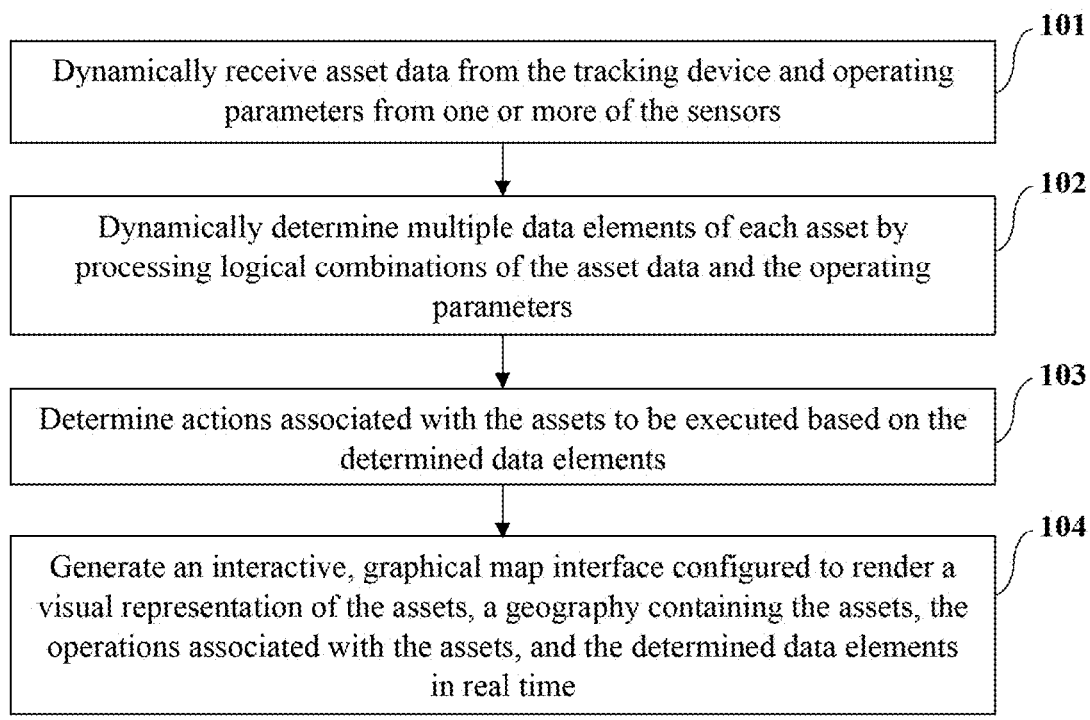
FIG. 1 illustrates a method for managing operations and assets associated with multiple entities, according to an embodiment herein.

FIG. 1 illustrates a method for managing operations and assets associated with multiple entities, according to an embodiment herein. The operations comprise, for example, ground handling operations, implemented for servicing the assets, while the assets are on the ground in an industrial environment, for example, on an airport apron in an airport environment. The assets comprise motorized equipment, non-motorized equipment, machine assets, and mobile assets as disclosed above, operated by entities such as airports, airlines, catering providers, ground handling companies, etc. The method disclosed herein employs a tracking device operably coupled to each of the assets. The tracking device collects asset data from each of the assets. In an embodiment, the tracking device is a tracking and telematics device operably coupled to the motorized equipment. In another embodiment, the tracking device is a wireless beacon tag attached to the non-motorized equipment. The wireless beacon tag is configured to be read by a tag reader for retrieving location data of the non-motorized equipment.

The method disclosed herein also employs multiple sensors for measuring and monitoring multiple operating parameters of the asset(s) in real time. One or more of the sensors are operably coupled to one or more of the assets. The sensors comprise, for example, fuel level sensors, temperature sensors, tyre pressure sensors, proximity detection systems, impact sensors, camera systems, etc., as disclosed in the detailed description of FIG. 3. The camera systems are configured to continuously capture images of an environment around each of the assets for incident investigation, process audits, and an analysis of training needs. The operating parameters measured and monitored by the sensors comprise, for example, (a) fuel level of the motorized equipment; (b) temperature of the assets; (c) tyre pressure of one or more of the assets; (d) proximity of the assets to external objects; (e) damage to the assets; etc. In an embodiment, the sensors are operably coupled and interfaced to the tracking device. The tracking device collects asset data of each of the assets from signals received from the sensors and communicates the asset data to the operations management engine for determination of data elements associated with each of the assets. In an embodiment, the method disclosed herein also employs multiple access control devices, in operable communication with the operations management engine, for providing authorized access to the assets as disclosed in the detailed description of FIGS. 2-3. The access control devices are, for example, access control readers or scanners configured to read or scan tags or cards containing identification information of operators or users of the assets. The access control devices are configured to communicate with the operations management engine via multiple communication protocols for authorizing the access to the assets and facilitating behavior monitoring, audit logging, and investigation actions.

The method disclosed herein also employs the operations management engine configured to define computer program instructions executable by at least one processor for managing operations and assets associated with multiple entities. The processor(s) is in operable communication with the tracking device and the sensors. The operations management engine dynamically receives 101 the asset data from the tracking device and the operating parameters from the sensor(s). The operations management engine dynamically determines 102 multiple data elements of each of the assets by processing logical combinations of the asset data and the operating parameters as disclosed in the detailed descriptions of FIGS. 4A-4B, FIG. 5, and FIGS. 6A-6D. The data elements comprise, for example, location, asset status, operating status, operational capability, availability, asset proximity to asset requirement, health, fuel level, speed of movement, machine asset hours, utilization pattern, operator or driver behavior, etc., associated with each of the assets. The asset status comprises, for example, a power on/off status of each of the assets. The operating status comprises one or more of, for example, availability, drive status, work status, standby status, and service status of each of the assets.

The operations management engine determines 103 actions associated with the assets to be executed based on the determined data elements by performing at least one of the following. The operations management engine identifies optimal assets from among multiple assets to be allocated for tasks associated with the operations as disclosed in the detailed description of FIG. 5. The operations management engine identifies value-added machine asset hours and non-value-added machine asset hours for reducing fuel consumption and maintenance costs while extending warranty periods. The operations management engine identifies the location of any of the assets requiring refueling based on the fuel level of the corresponding asset, and in communication with a fuel management system, facilitates a proactive refueling operation to the identified location. The operations management engine, in communication with a maintenance management system, forecasts preventive maintenance intervals and executes maintenance planning and scheduling using the machine asset hours and the utilization pattern of each of the assets as disclosed in the detailed description of FIGS. 6A-6D. The operations management engine determines a maximum number of assets needed and used during peak operational periods for determining a fleet size needed to meet operational requirements.

In an embodiment, the operations management engine forecasts a type and a count of each of the assets required to handle each of the operations along with a duration of engagement, a start time of the engagement, and an end time of the engagement using schedules, engagement standards, and a compatibility matrix defining machine types that each of the assets is configured to service as disclosed in the detailed description of FIG. 5. In another embodiment, the operations management engine compares an actual deployment of each of the assets with a forecasted and planned allocation of each of the assets for each of the operations, and generates a report highlighting variations resulting from the comparison for executing corrective actions. In another embodiment, the operations management engine executes turnaround monitoring for confirming presence of each of the assets allocated for each of the operations at a required operational area at a required time and for confirming completion of the operations for billing the entities. In another embodiment, the operations management engine creates and manages geofences in an environment around each of the assets, in communication with the access control devices and the tracking device, to preclude unauthorized assets from entering the environment and to preclude unauthorized movement of the assets within the environment. In another embodiment, the operations management engine, in communication with the fuel management system, automatically acquires fueling data comprising quantity of fuel dispensed to any of the assets and manages financial transactions associated with the fueling data. In another embodiment, the operations management engine triggers alerts associated with the data elements and the assets for notifying the entities to initiate proactive mitigation and recovery actions. In another embodiment, the operations management engine, in communication with a billing management system, electronically acquires and processes billing information for operations external to standard service-level agreements.

Figure 7A:
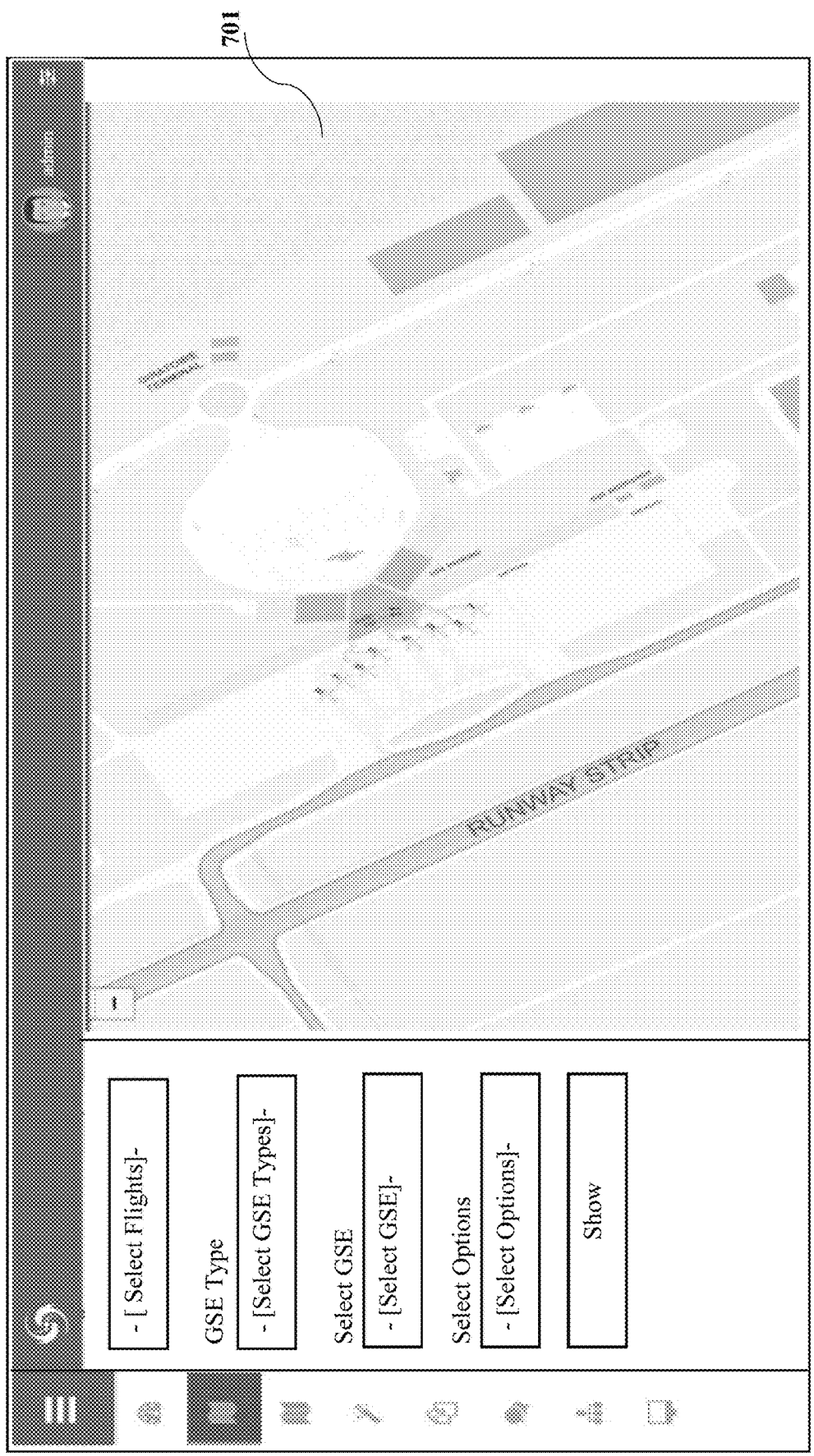
FIGS. 7A-7B exemplarily illustrate screenshots of an interactive, graphical map interface generated by the operations management engine for real-time monitoring and facilitating execution of actions associated with ground handling operations, according to an embodiment herein.
Figure 7B:
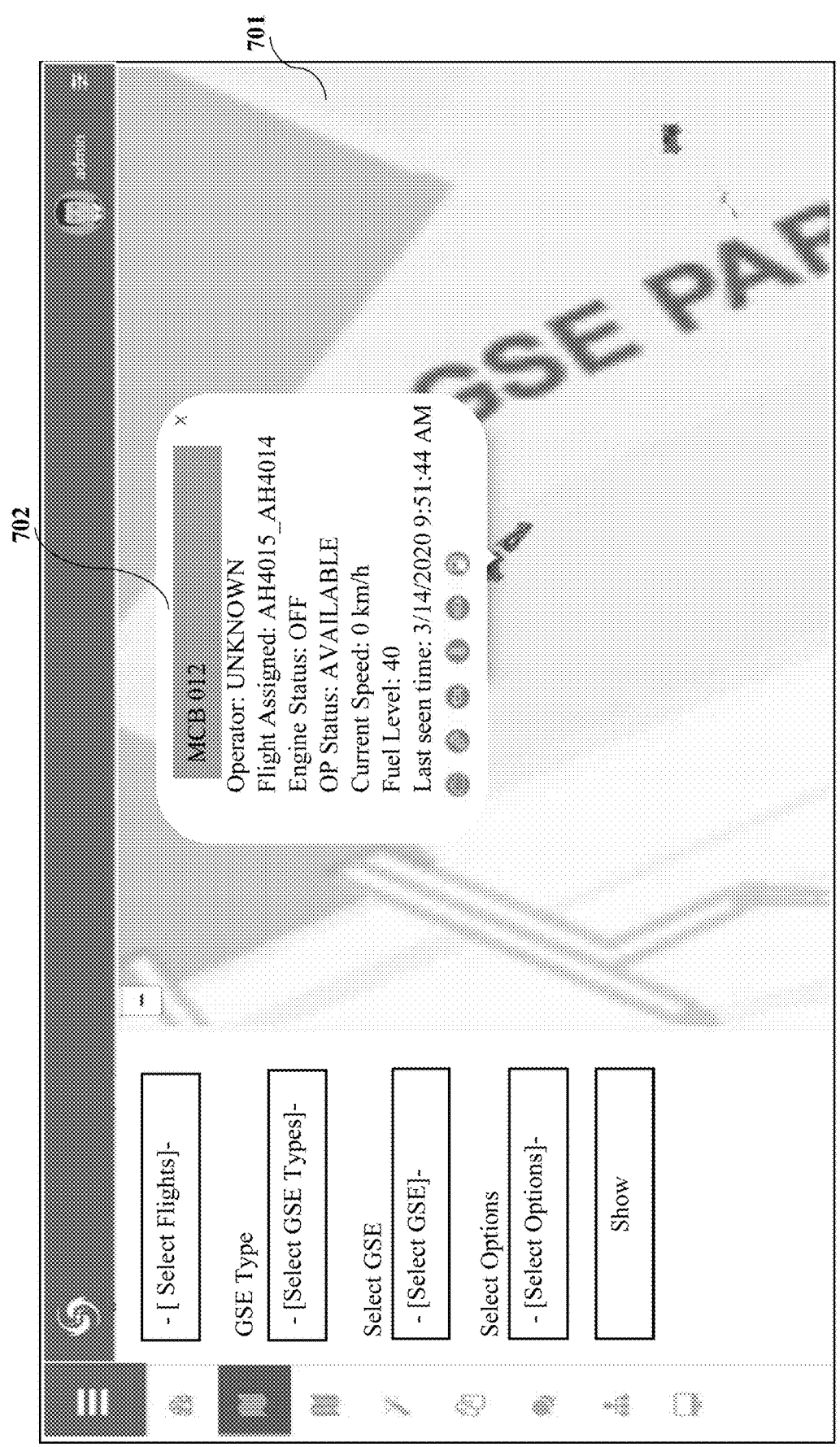
Figure 7C:
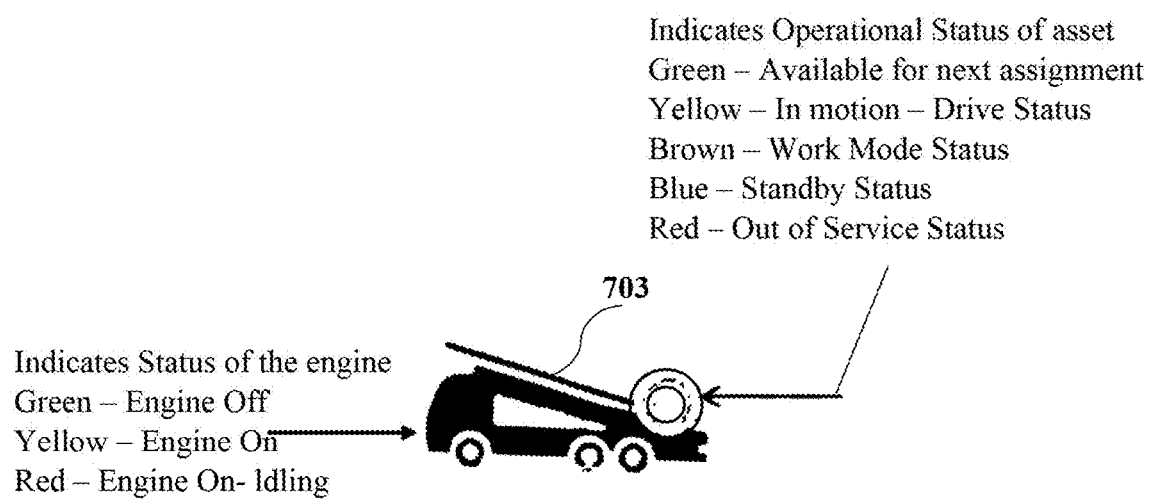
FIG. 7C exemplarily illustrates an interface element displayed on an interactive, graphical map interface generated by the operations management engine for indicating asset status and operating status of an asset, according to an embodiment herein.

The operations management engine generates 104 an interactive, graphical map interface configured to render a visual representation of the assets, a geography containing the assets, the operations associated with the assets, and the determined data elements in one or more of multiple visual configurations in real time for real-time monitoring and facilitating execution of the determined actions associated with the assets as disclosed in the detailed description of FIGS. 7A-7C. The visual representation rendered on the interactive, graphical map interface is configured to perform at least one of: (a) displaying detailed information on the data elements of each of the assets; (b) allowing measurement of distance; (c) displaying geographic coordinates; (d) capturing and displaying routes used by the assets; (e) triggering playback of the visual representation; (f) configuring geofences for executing geofencing; (g) flagging discrepancies and issues correlated to the location of each of the assets for facilitating proactive recovery actions; (h) performing selective assignment actions; (i) performing historical data analysis; (j) displaying real-time information on traffic patterns on roads to be travelled by the assets; and (k) displaying day operations, role-specific dashboards. The visual configurations in which the visual representation of the assets, the geography containing the assets, the operations associated with the assets, and the determined data elements are rendered comprise configurations, for example, by one or more of flight, gate, geofence locations, airline, asset type, fuel level, health status, asset identifier, individual assets, asset status, operating status, location, department, operator, ad hoc service provision, violations, operator behavior, faults, and maintenance. In an embodiment, the assets and the determined data elements are rendered on the interactive, graphical map interface using predefined color-coded interface elements representative of monitored functions and statuses. In an embodiment, the interactive, graphical map interface is deployable on a user device and configurable based on user roles and allocation of the assets for monitoring the assets in real time and initiating corrective actions on the assets.

Figure 3:
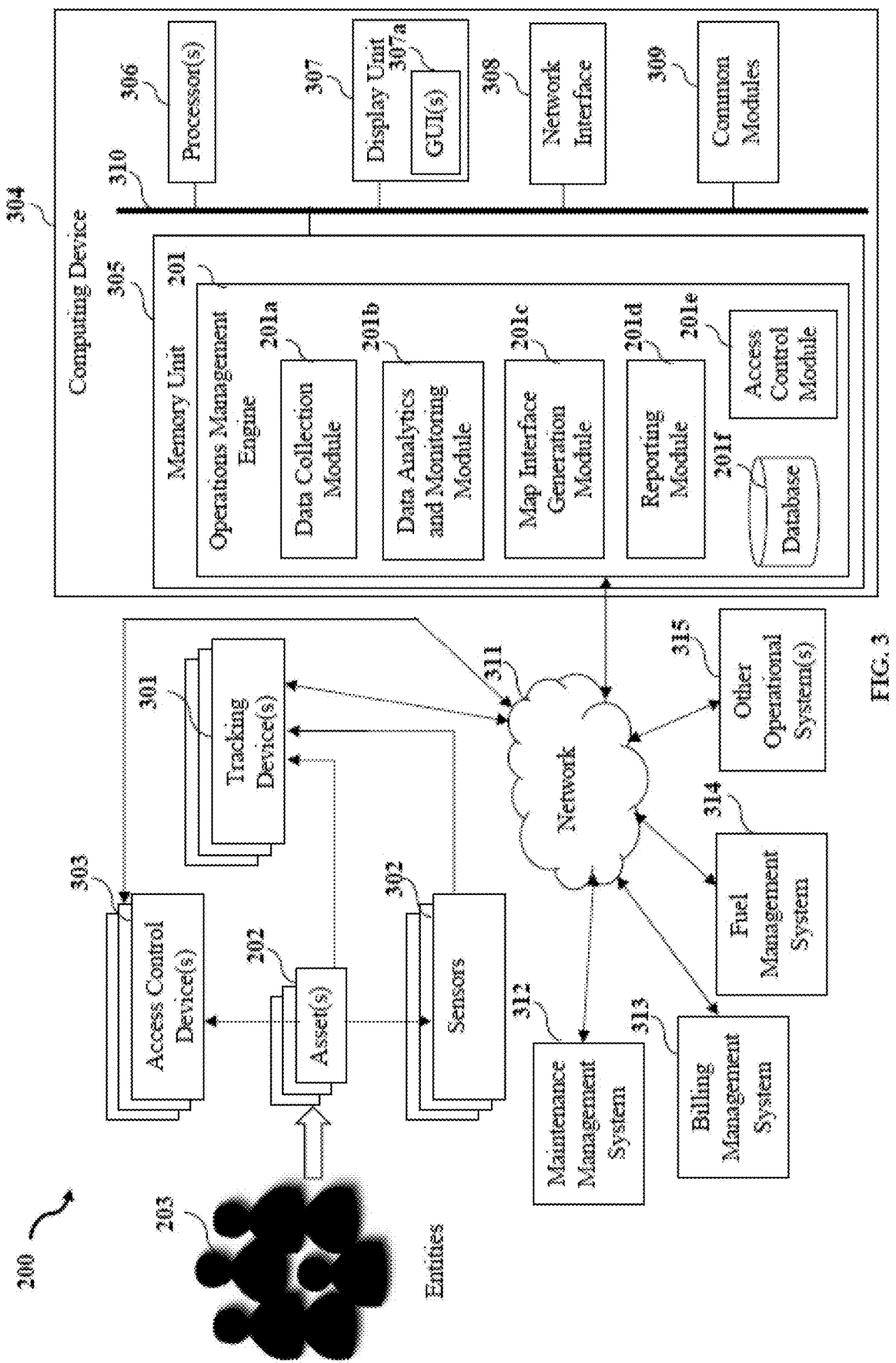
FIG. 3 illustrates an architectural block diagram of an exemplary implementation of the system for managing operations and assets associated with multiple entities, according to an embodiment herein.

In an embodiment, the operations management engine is configured to interface with multiple operational systems to render supplementary information associated with the assets on the interactive, graphical map interface as disclosed in the detailed description of FIG. 3. The operational systems comprise, for example, an operations database, resource management systems, contracts and biking systems, a training and operator licensing system, etc. In an embodiment, the operations management engine generates reports with key performance indicators, for example, on one or more of operator performance, operator behavior, the actions performed, operator productivity, and compliance to standards.

Figure 2:
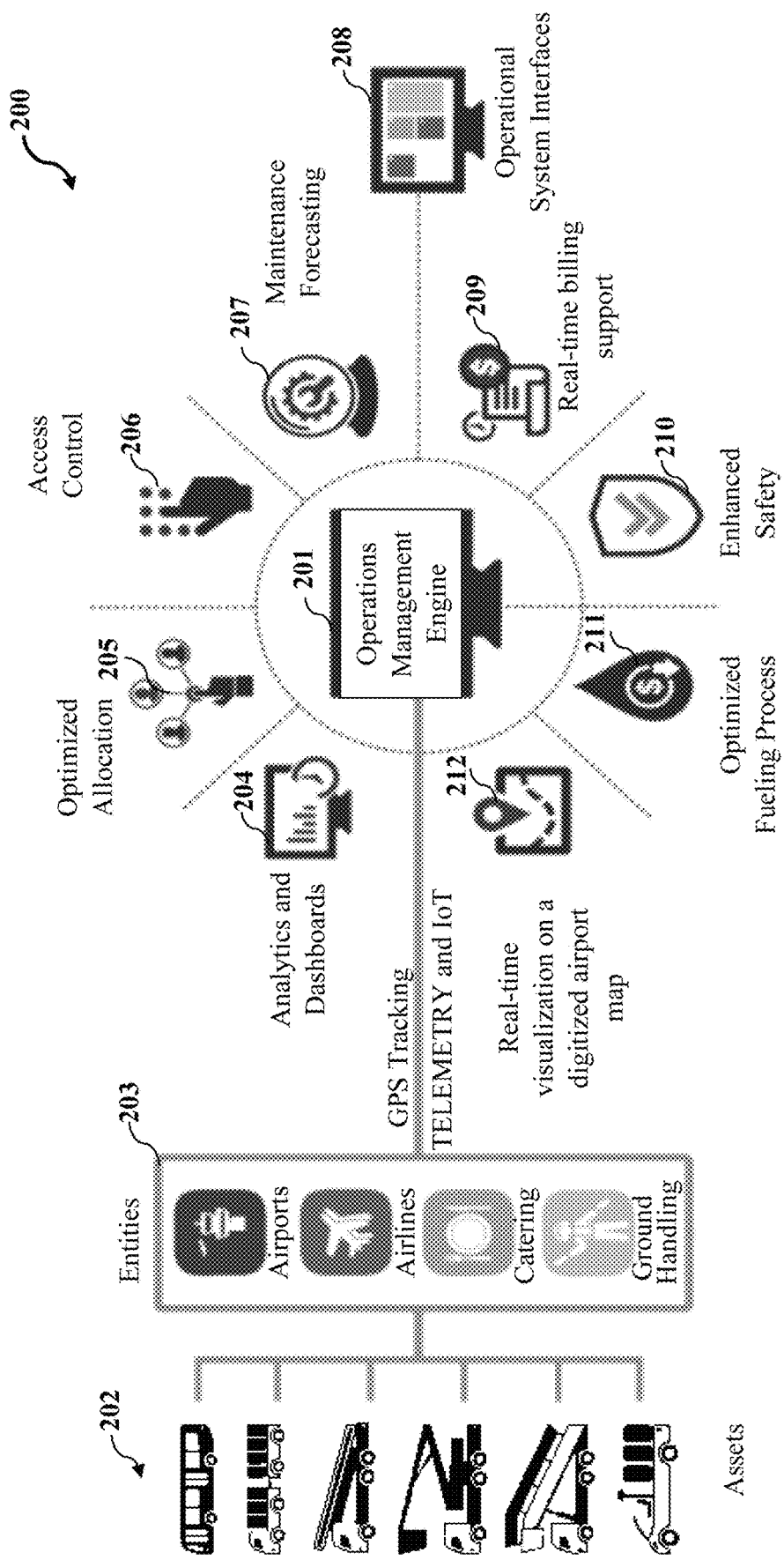
FIG. 2 exemplarily illustrates a high-level diagram of a system for managing ground handling operations and assets associated with multiple entities, according to an embodiment herein.

FIG. 2 exemplarily illustrates a high-level diagram of a system 200 for managing ground handling operations and assets 202 associated with multiple entities 203, according to an embodiment herein. The system 200 employs a combination of hardware and software to execute functionalities of the method disclosed herein comprising location tracking, status monitoring, telematics information acquisition, access control, and managing operator or driver/driving behavior. The system 200 disclosed herein comprises the operations management engine 201 for monitoring, tracking, and managing the operations and the assets 202. As exemplarily illustrated in FIG. 2, the assets 202 comprise, for example, motorized equipment, non-motorized equipment, etc., operated by multiple entities 203 such as airports, airlines, catering providers, ground handling companies, etc. As used herein, "motorized equipment" refers to equipment that have a power source, for example, an engine or a battery, that allows the equipment to be driven and/or that is used for generating power required for carrying out a function of the equipment. Some equipment contain a power source only used for delivery and execution of a function. These equipment are subsequently towed using another piece of equipment, for example, a tractor, from location to location. In an embodiment, the hardware used on the motorized equipment comprises a telematics and tracking device and an access control device. One or more sensors and control system elements from the motorized equipment are interfaced to the telematics and tracking device to obtain signals for generating asset data required for determining data elements, for example, engine and operating status, equipment health, fuel level, etc. The signals or asset data used for determining the data elements varies from equipment to equipment based on the function of the equipment. In an embodiment, the telematics and tracking device communicates with the operations management engine 201 and executes data exchange with the operations management engine 201 via multiple communication protocols, for example, a third generation (3G) communication protocol, a fourth generation (4G) communication protocol, a fifth generation (5G) communication protocol, a long-term evolution (LTE) communication protocol, a low-power wide area network protocol such as LoRa® of Semtech Corporation, other wireless network protocols, etc. In another embodiment, the telematics and tracking device comprises a Wi-Fi® hotspot for wireless communication between the telematics and tracking device and the operations management engine 201 and other devices via a network.

In an embodiment, the access control device comprises a tag reader configured to read and authenticate an access control element, for example, a tag or a card, in communication with the operations management engine 201. The access control element is a unique identification element that identifies an operator or user of each of the assets 202. The system 200 disclosed herein employs the access control element configured to be read by the tag reader for authenticating an operator or user of each of the assets 202, providing authorized access to the assets 202, and ensuring authorized usage of the assets 202. In an embodiment, the tag reader is directly wired to the access control device that is installed on the motorized equipment. The access control device in conjunction with the access control element executes an authorized operation for providing authorized access to the assets 202 and ensuring authorized usage of the assets 202. The tag reader of the access control device is configured based on the type of access control element employed. For example, the system 200 employs an access control tag such as an iButton device or a Dallas key in conjunction with an iButton reader such as a blue dot receptor that is installed on the access control device for authenticating an operator or a user of an asset 202. In another example, the access control element is an identity card provided to an operator or a user of an asset 202 by an entity such as an employer for facilitating access control. In an embodiment, the identity card comprises an embedded microchip that stores credentials of the operator. The operator presents the identity card to a tag or card reader of the access control device configured for that card type for authentication. In an embodiment, the identity card is a contactless card configured with an internal antenna and chip that reacts once the identity card is within a magnetic field of the tag or card reader. In an embodiment, the access control device communicates with the operations management engine 201 and executes data exchange with the operations management engine 201 via multiple communication protocols, for example, a 3G communication protocol, a 4G communication protocol, a 5G communication protocol, an LTE communication protocol, a low-power wide area network protocol such as the LoRa® protocol, other wireless network protocols, etc., for authorizing access to the assets 202 and facilitating behavior monitoring, audit logging, and investigation actions. In an embodiment, the operations management engine 201 maintains an operator master table in a database. The operator master table stores information that references credentials of the operator with the type of assets 202 that the operator is trained and licensed to operate. When the operator presents the access control element such as the tag or the card to a corresponding reader installed on the access control device, the access control device accesses the operator master table via the network and authenticates whether the operator is licensed to operate the asset 202. On successful authentication of the operator, the operations management engine 201 activates or switches on the asset 202 for use by the operator.

Also, as used herein, "non-motorized equipment" refers to equipment that do not have a power source. For example, trailers, also referred to as "dollies" in the aviation industry, that are used to transport baggage and cargo between terminals and an aircraft, are classified as non-motorized equipment. Non-motorized equipment is towed by mobile assets, for example, tractors, between locations. In an embodiment, a wireless beacon tag, for example, a Bluetooth Low Energy (BLE) tag is installed on each piece of the non-motorized equipment. In an embodiment, the telematics and tracking device comprises a BLE reader for receiving signals transmitted by the BLE tags that are attached to the non-motorized equipment. The BLE readers installed in the telematics and tracking devices on the tractors that tow the non-motorized equipment receive signals comprising, for example, location data and other asset data of the non-motorized equipment, transmitted by the BLE tags. The BLE readers then transmit the signals to the operations management engine 201 for data exchange and determination of the data elements associated with the non-motorized equipment. One or more sensors and control system elements from the assets 202 are interfaced to the telematics and tracking device to obtain signals required for determining the data elements. The signals used for determining the data elements vary from asset to asset based on the function of the asset 202.

The operations management engine 201 is operably connected to operational system interfaces 208 of multiple operational systems, fix example, operations databases, resource management systems, contracts and billing systems, training and operator licensing systems, etc. The operations management engine 201 communicates with the operational systems to receive, process, and render supplementary information associated with the assets 202 on an interactive, graphical map interface. The operational system interfaces 208 are seamless interfaces to other operational systems used by various entities 203, for example, stakeholders and service providers. The interfaces with operational systems provide users with a complete overview and control of their operational processes based on the deployment of assets 202 such as motorized equipment. By fully and seamlessly integrating to other operational systems, the operations management engine 201 allows various users to monitor and control their asset related processes from a single graphical user interface or screen, specific to their individual role.

The telematics and tracking device installed on the motorized equipment collects signals from the motorized equipment and from location tags fitted on the non-motorized equipment, while the operations management engine 201 receives, processes, and interprets the signals, asset data, and operating parameters to determine multiple data elements. The data elements provide real-time visibility of location, status, and other mission critical information of the assets 202 on the interactive, graphical map interface. In an embodiment, the operations management engine 201 configures the interactive, graphical map interface as a digitized airport map for use in an airport environment. The data elements provide information for proactive scheduled and unscheduled maintenance of equipment based on utilization and allow monitoring of the health of the assets 202. The data elements also facilitate optimization of asset utilization and reduction in fuel consumption, carbon footprint, and maintenance costs.

As exemplarily illustrated in FIG. 2, the operations management engine 201 executes multiple functionalities to overcome challenges in managing operations such as ground handling operations. The operations management engine 201 performs analytics and generates dashboards 204 and other graphical user interfaces as disclosed in the detailed descriptions of FIGS. 9A-9G. FIGS. 10A-10B, FIGS. 11A-11B, and FIGS. 12A-12C. The operations management engine 201 also performs optimized allocation 205 of assets 202 by identifying optimal assets from among multiple assets 202 to be allocated for tasks associated with the operations as disclosed in the detailed description of FIG. 5. For example, the operations management engine 201 allocates optimal assets for flights based on location and status of the assets 202. Furthermore, the operations management engine 201 implements access control 206 using the access control devices to ensure access of the assets 202 only by authorized personnel. The operations management engine 201 also allows only authorized usage of the assets 202 using the access control devices. Furthermore, the operations management engine 201 performs maintenance forecasting 207 that allows proactive scheduled and unscheduled maintenance of equipment based on utilization. Furthermore, the operations management engine 201 provides real-time billing support 209 by interfacing with a billing management system. Furthermore, the operations management engine 201 performs proactive and data-driven monitoring of driving habits for enhanced safety 210. Furthermore, the operations management engine 201 implements optimized fueling processes 211 by interfacing with a fuel management system and introducing proactive refueling procedures. Furthermore, the operations management engine 201 provides real-time visualization 212 of data elements such as operating status, operational capability, availability, asset proximity to asset requirement, health, fuel level, speed of movement, machine asset hours, utilization pattern, operator behavior, etc., of each of the assets 202 on an interactive, graphical map interface, for example, a digitized airport map. In an embodiment, the operations management engine 201 provides a replay and retrace tool on the interactive, graphical map interface for allowing a user to replay a route traversed by each asset 202.

In an embodiment, the operations management engine 201 provides a single source of information of all assets 202 in the form of an asset registry, thereby providing complete visibility of all assets 202, for example, on the airside. With the seamless integration to other operational systems. In an embodiment, the operations management engine 201 generates day operations, role specific dashboards while providing tools for enabling decision support systems. In an embodiment, the operations management engine 201 generates dashboards with configurable key performance indicators (KPIs) on one or more of operator performance, operator behavior, the actions performed, operator productivity, and compliance to standards, for providing decision making support. The system 200 disclosed herein executes 100% billing of services provided on an ad hoc basis and contributes directly to increased equipment availability and productivity, lower total cost of ownership, extended asset lifecycle and warranties, enhanced safety and security, and enhanced environmental benefits. The system 200 disclosed herein improves productivity and efficiency, for example, by real-time monitoring of location and status, allocation improvements, reduced maintenance due to utilization strategy, and real-time automated billing of services rendered.

FIG. 3 illustrates an architectural block diagram of an exemplary implementation of the system 200 for managing operations, for example, ground handling operations, and assets 202 associated with multiple entities 203, according to an embodiment herein. As exemplarily illustrated in FIG. 3, the system 200 disclosed herein comprises tracking devices 301, sensors 302, and access control devices 303 operably coupled to assets 202, for example, motorized equipment, non-motorized equipment, etc., associated with multiple entities 203 also referred to as "stakeholders" such as airports, airlines, catering providers, ground handling companies, etc., as disclosed in the detailed description of FIG. 2. One or more sensors 302 and control system elements from the assets 202 are interfaced to the tracking devices 301 to obtain signals for generating asset data required for determining data elements, for example, engine and operating status, equipment health, fuel level, etc. The sensors 302 provide information in real time to the operations management engine 301 to enhance the monitoring of the operations of the assets 202 and facilitate decision making. The sensors 302 comprise, for example, fuel level sensors, temperature sensors, tyre pressure sensors, proximity detection systems, and camera systems. The fuel level sensors are configured to measure and monitor the fuel level of motorized equipment, for example, motorized ground support equipment (GSE). The operations management engine 201 receives the fuel levels from the fuel level sensors and calibrates the fuel levels, for example, as percentages 20%, 40%, 60%, 80%, and 100%. The operations management engine 201 compares the fuel levels to a set threshold value, triggers low level alerts when the fuel levels fall below the set threshold value, and initiates actions. The actions comprise, for example, generating a visual representation of the fuel levels on a graphical user interface (GUI) 307a and/or on an interactive, graphical map interface such as a digitized airport map and transmitting messages to user devices of the corresponding entities 203.

The temperature sensors are, for example, Bluetooth low energy (BLE)-based temperature internet-of-things (IoT) sensors configured to continuously monitor the temperature within a cabin of an asset 202, for example, a passenger coach and other GSE. The temperature sensors are also configured to monitor and measure the temperature at outlet hoses of air conditioning units. The operations management engine 301 receives the measured values from the temperature sensors and compares the measured values against set threshold values. Based on the comparison, the operations management engine 201 initiates actions comprising, for example, generating a visual representation of the measured values on the GUI 307a and for on an interactive, graphical map interface such as a digitized airport map and transmitting messages to user devices of the corresponding entities 203.

The tyre pressure sensors are, for example, BLE-enabled tyre pressure monitoring systems that are fitted to specific GSE such as pushback tractors, passenger coaches, passenger with restricted mobility transport equipment, catering trucks, etc. The tyre pressure sensors continuously monitor and measure the tyre pressure of each individual tyre and compares the tyre pressure against set threshold values. Based on the comparison, the operations management engine 201 initiates actions comprising, for example, generating a visual representation of the measured tyre pressure values on the GUI 307a and/or on an interactive, graphical map interface such as a digitized airport map and transmitting messages to user devices of the corresponding entities 203. The proximity detection systems are installed on the assets 202, for example, the GSE, to aid safe operations. The proximity detection systems detect any object, for example, vehicles, other equipment, aircraft fuselage, aircraft engines, etc., in proximity to the assets 202 and provide alerts to an operator of the assets 202 and to other entities 203. The camera systems are configured to capture and render a continuous feed or events triggered. The images, for example, videos and pictures captured by the camera systems aid the entities 203 in incident investigation, process audits, and an analysis of training needs.

In an embodiment, the tracking devices 301 collect asset data from the sensors 302 and transmit the collected data to the operations management engine 201 via a network 311, for example, a short-range network or a long-range network. The network 311 is, for example, one of the internet, an intranet, a wired network, a wireless network, a communication network that implements Bluetooth® of Bluetooth Sig, Inc., a network that implements Wi-Fi® of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. In another embodiment, the tracking devices 301 collect identification data from the access control devices 303 and transmit the collected data to the operations management engine 201 via the network 311. In another embodiment, the access control devices 303 transmit the identification data directly to the operations management engine 201 via the network 311.

In an embodiment, the operations management engine 201 is deployed in a computing device 304 as exemplarily illustrated in FIG. 3. The computing device 304 is a computer system programmable using high-level computer programming languages. The computing device 304 is an electronic device, for example, one or more of a personal computer, a tablet computing device, a mobile computer, a portable computing device, a laptop, a workstation, a server, a portable electronic device, a network enabled computing device, an interactive network enabled communication device, any other suitable computing equipment, combinations of multiple pieces of computing equipment, etc. In an exemplary implementation of the system 200 disclosed herein, the computing device 304 is configured as an application server. In an embodiment, the operations management engine 201 is implemented in the computing device 304 using programmed and purposeful hardware. In an embodiment, the operations management engine 201 is a computer-embeddable system that manages operations and assets 202 associated with multiple entities 203.

The operations management engine 201 in the computing device 304 communicates with multiple devices, servers, and subsystems, for example, the tracking devices 301, the sensors 302, the access control devices 303, associated readers or scanners, and operational systems 312, 313, 314, and 315 via the network 311. In another embodiment, the operations management engine 201 is implemented in a cloud computing environment. As used herein, "cloud computing environment" refers to a processing environment comprising configurable computing physical and logical resources, for example, networks, servers, storage media, virtual machines, applications, services, etc., and data distributed over the network 311. The cloud computing environment provides an on-demand network access to a shared pool of the configurable computing physical and logical resources. In an embodiment, the operations management engine 201 is a cloud computing-based platform implemented as a service for managing operations and assets 202 associated with multiple entities 203. In another embodiment, the operations management engine 201 is implemented as an on-premise platform comprising on-premise software installed and run on client systems on the premises of a facility, for example, an airport facility.

As exemplarily illustrated in FIG. 3, the computing device 304 comprises a non-transitory, computer-readable storage medium, for example, a memory unit 305 for storing computer program instructions defined by modules, for example, 201a, 201b, 201c, 201d, 201e, etc., of the operations management engine 201. As used herein, "non-transitory, computer-readable storage medium" refers to all computer-readable media that contain and store computer programs and data. Examples of the computer-readable media comprise hard drives, solid state drives, optical discs or magnetic disks, memory chips, a read-only memory (ROM), a register memory, a processor cache, a random-access memory (RAM), etc. The computing device 304 further comprises at least one processor 306 operably and communicatively coupled to the memory unit 305 for executing the computer program instructions defined by the modules, for example, 201a, 201b, 201c, 201d, 201e, etc., of the operations management engine 201. In an embodiment, the processor(s) 306 is in operable communication with the tracking devices 301, the sensors 302, the access control devices 303, the operational systems 312, 313, 314, and 315, and other devices, servers, and subsystems of the system 200 via the network 311. The memory unit 305 is used for storing program instructions, applications, and data. In an embodiment, the memory unit 305 is a random-access memory (RAM) or another type of dynamic storage device that stores information and instructions for execution by the processor 306. The memory unit 305 also stores temporary variables and other intermediate information used during execution of the instructions by the processor 306. In an embodiment, the computing device 304 further comprises a read only memory (ROM) or other types of static storage devices that store static information and instructions for execution by the processor 306. In an embodiment, the modules, for example, 201a, 201b, 201c, 201d, 201e, 201f, etc., of the operations management engine 201 are stored in the memory unit 305.

The processor(s) 306 is configured to execute the computer program instructions defined by the modules, for example, 201a, 201b, 201c, 201d, 201e, etc., of the operations management engine 201 for managing operations and assets 202 associated with multiple entities 203. The modules, for example, 201a, 201b, 201c, 201d, 201e, etc., of the operations management engine 201, when loaded into the memory unit 305 and executed by the processor 306, transform the computing device 304 into a specially-programmed, special purpose computing device configured to implement the functionality disclosed herein. The processor 306 refers to any one or more microprocessors, central processing unit (CPU) devices, finite state machines computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. In an embodiment, the processor 306 is implemented as a processor set comprising, for example, a programmed microprocessor and a math or graphics co-processor. The operations management engine 201 is not limited to employing the processor 306. In an embodiment, the operations management engine 201 employs a controller or a microcontroller. The processor 306 executes the modules, for example, 201*a*, 201*b*, 201*c*, 201*d*, 201*e*, etc., of the operations management engine 201. In another embodiment, multiple processors are implemented at different stages in the cycle of managing operations and assets 202 associated with multiple entities 203 for executing the modules, for example, 201*a*, 201*b*, 201*c*, 201*d*, 201*e*, etc., of the operations management engine 201.

As exemplarily illustrated in FIG. 3, the computing device 304 further comprises a data bus 310, a display unit 307, a network interface 308, and common modules 309. The data bus 310 permits communications between the modules, for example, 305, 306, 307, 308, and 309 of the computing device 304. The display unit 307, via the GUI(s) 307*a*, displays information, images, display interfaces, user interface elements such as checkboxes, input text fields, etc., for example, for allowing a user to enter input information such as flight information, type of ground support equipment (GSE), etc., and select filter criteria for displaying a visual representation of the assets 202, a geography containing the assets 202, the operations associated with the assets 202, and the determined data elements in one or more visual configurations in real time for real-time monitoring and facilitating execution of the determined actions associated with the operations and the assets 202. The display unit 307, via the GUI(s) 307*a*, also displays dashboards and reports generated by the operations management engine 201. The GUI(s) 307*a* comprise, for example, online web interface(s), web-based downloadable application interface(s), mobile-based downloadable application interface(s), etc.

The network interface 308 enables connection of the computing device 304 to the network 311. In an embodiment, the network interface 308 is provided as an interface card also referred to as a line card. The network interface 308 is, for example, one or more of infrared interfaces, interfaces implementing Wi-Fi® of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol (TCP)/internet protocol (IP), interfaces based on wireless communications technology such as satellite technology, radio frequency technology, near field communication, etc. The common modules 309 of the computing device 304 comprise, for example, input/output (I/O) controllers, input devices, output devices, fixed media drives such as hard drives, removable media drives for receiving removable media, etc. Computer applications and programs are used for operating the computing device 304. The programs are loaded onto fixed media drives and into the memory unit 305 via the removable media drives. In an embodiment, the computer applications and programs are loaded into the memory unit 305 directly via the network 311.

In an exemplary implementation of the system 200 illustrated in FIG. 3, the operations management engine 201 comprises a data collection module 201*a*, a data analytics and monitoring module 201*b*, a map interface generation module 201*c*, a reporting module 201*d*, an access control module 201*e*, and optionally a database 201*f*, stored in the memory unit 305 and executed by the processor 306 in the computing device 304. The data collection module 201*a* dynamically receives the asset data from the tracking devices 301 and the operating parameters from the sensors 302. The data analytics and monitoring module 201*b* dynamically determines multiple data elements comprising, for example, location, asset status, operating status, operational capability, availability, asset proximity to asset requirement, health, fuel level, speed of movement, machine asset hours, utilization pattern, operator behavior, etc., associated with each of the assets 202 by processing logical combinations of the asset data and the operating parameters as disclosed in the detailed descriptions of FIG. 1, FIGS. 4A-4B, FIG. 5, and FIGS. 6A-6D.

The data analytics and monitoring module 201*b* determines actions associated with the assets 202 to be executed based on the determined data elements by performing at least one of the following. The data analytics and monitoring module 201*b* identifies optimal assets from among multiple assets 202 to be allocated for tasks associated with the operations as disclosed in the detailed description of FIG. 5. The data analytics and monitoring module 201*b* identifies value-added machine asset hours and non-value-added machine asset hours for reducing fuel consumption and maintenance costs while extending warranty periods. The data analytics and monitoring module 201*b* identifies the location of any of the assets 202 requiring refueling based on the fuel level of the corresponding asset, and in communication with a fuel management system 314, facilitates a proactive refueling operation to the identified location. The data analytics and monitoring module 201*b*, in communication with a maintenance management system 312 via the network 311, forecasts preventive maintenance intervals and executes maintenance planning and scheduling using the machine asset hours and the utilization pattern of each of the assets 202. The data analytics and monitoring module 201*b* determines a maximum number of assets 202 needed and used during peak operational periods for determining a fleet size needed to meet operational requirements.

In an embodiment, the data analytics and monitoring module 201*b* forecasts a type and a count of each of the assets 202 required to handle each of the operations along with a duration of engagement, a start time of the engagement, and an end time of the engagement using schedules, engagement standards, and a compatibility matrix defining machine types that each of the assets 202 is configured to service as disclosed in the detailed description of FIG. 5. In an embodiment, the data analytics and monitoring module 201*b* is configured as an asset forecasting, planning, and allocation module. In this embodiment, the data analytics and monitoring module 201*b* operates, for example, around flight schedules, engagement standards, and a ground support equipment (GSE)-aircraft compatibility matrix. The data collection module 201*a* receives flight schedules, for example, by interfacing with relevant operating systems, importing the flight schedules from a spreadsheet, receiving manual user entries, etc. The flight schedules provide information comprising, for example, an aircraft type, an estimated time of arrival (ETA), and an estimated time of departure (ETD), thereby determining turnaround time. In an embodiment, the operations management engine 201 communicates with an engagement standards database that defines the type, count, and engagement start and end times of the asset based on the aircraft type, handling agreement between an airline and a ground handler. Consider an example where Boeing 787 requires a ground power unit (GPU) from ETA+0 mins to ETD−2 mins. The GSE-aircraft compatibility matrix defines aircraft types that each GSE is configured to service. For example, GPU—Make XYZ—Model ABC—Fleet #1234 is configured to service wide bodied aircrafts A340, A330, B777, and B747. The data analytics and monitoring module 201b, in communication with the data collection module 201a, forecasts the type and count of each GSE required to handle a flight along with the duration of engagement and the start time and end time of engagement. On the day of operations, the data analytics and monitoring module 201b facilitates planning by identifying the best fit GSE by fleet number that can be allocated for that flight. Closer to the time of requirement, the data analytics and monitoring module 201b further refines the allocation possibilities by highlighting the GSE closest to the aircraft parking bay and available for allocation.

In another embodiment, the data analytics and monitoring module 201b compares an actual deployment of each of the assets 202 with a forecasted and planned allocation of each of the assets 202 for each of the operations. The data analytics and monitoring module 201b performs a comparison of plan versus actuals. The data analytics and monitoring module 201b compares the actual deployment of assets 202, for example, GSE, for a flight with the forecast and planned allocation. This comparison considers flight information comprising, for example, aircraft type, time of arrival, time of departure, aircraft parking stand, the type, count, start time of engagement, end time of engagement, and duration of engagement. The reporting module 201d, in communication with the data analytics and monitoring module 201b, generates one or more reports highlighting variations resulting from the comparison for executing corrective actions. The report(s) highlights variations or discrepancies between plan and actuals. The report(s) assists in identifying underpinning reasons for discrepancy, thereby allowing corrective measures to be taken.

In an embodiment, the access control module 201e implements access control with speed monitoring using the access control devices 303. The access control module 201e ensures that only authorized and assigned personnel operate the assets 202. In an embodiment, the access control devices 303 are operably linked to a training database to provide transparency, operator or driver accountability, and increased responsibility. The access control module 201e receives identification information of operators of the assets 202 from the access control devices 303 via the network 311. The access control module 201e accesses the operator master table maintained in the database 201f and authenticates whether an operator is licensed to operate an asset 202 using the received identification information. On successful authentication of the operator, the access control module 201e communicates with the access control device 303 installed on the asset 202 via the network 311 to activate or switch on the asset 202 for use by the operator. In an embodiment, the data analytics and monitoring module 201b is configured as a speed monitoring application for reporting all irregularities above a predefined threshold correlated to the location of the asset 202. The data collection module 201a communicates with the impact sensors to receive information of any damage to the assets 202 due to accidents or abuse. The data analytics and monitoring module 201b executes actions to ensure full responsibility and accountability by concerned operators. The reporting module 201d generates reports on driver performance, safe driving habits, productivity, and compliance to standards.

In an embodiment, multiple security devices and technologies, for example, iButton devices, key fobs, smart identification cards, proximity cards, biometric recognition devices for authenticating fingerprints, palm, face, iris, voice, etc., are implemented for access control. When the operator uses an access control device 303, the access control module 201e verifies the authenticity of the operator by comparing the operator's identification information against preset values and checking whether the operator has a valid driving permit for a given asset 202. If verified, the access control module 201e triggers activation of the ignition of the asset 202 such as the motorized equipment. If not verified, the access control module 201e does not trigger activation of the ignition of the asset 202, due to which the asset 202 does not start, but triggers an alert of an unauthorized usage attempt to a relevant entity. The access control module 201e records each access control attempt in the database 201f with operator details, data and time sunup, authenticity, and asset details, thereby facilitating any audit and/or investigation actions while also facilitating safe operating behavior monitoring.

In another embodiment, the access control module 201e implements geo-fencing by creating and managing geofences in an environment around each of the assets 202, in communication with the access control devices 303 and the tracking devices 301, to preclude unauthorized assets from entering the environment and to preclude unauthorized movement of the assets 202 within the environment. Geofencing allows a user to mark areas as no-go for individual asset categories on the GUI(s) 307a and/or the interactive, graphical map interface generated by the map interface generation module 201c. Any unauthorized asset entering these areas, triggers alerts or reports for control and corrective action. Geofencing coupled with access control provides control over unauthorized movement of assets 202 to non-operational areas. In an embodiment, the access control module 201e activates geofencing by allowing a user to select an area that is to be zoned on the interactive, graphical map interface, for example, in the shape of a polygon, a circle, a rectangle, etc., and identifying the relevant latitude/longitude values. The interactive, graphical map interface allows zones to be marked as permanent or temporary. If the user marks a zone as temporary, the interactive, graphical map interface allows the user to set start and end date/time values. In an embodiment, the interactive, graphical map interface identifies each zone, for example, by unique names, color codes, etc.

In another embodiment, the data analytics and monitoring module 201b executes turnaround monitoring for confirming presence of each of the assets 202 allocated for each of the operations at a required operational area at a required time and for confirming completion of the operations for billing the entities 203. The location tracking and status monitoring capabilities of the data analytics and monitoring module 201b coupled with the asset allocation and engagement standards allows the data analytics and monitoring module 201b to monitor flight turnaround. In an embodiment, without interfacing to allocation systems or allocation through the operations management engine 201, the operations management engine 201 monitors assets 202, for example, GSE, that should be in the relevant aircraft parking stand using geofences according to the engagement standards for the particular aircraft type. If any particular GSE type required for handling an aircraft, for example, is not in a geofence zone at the time needed based on threshold periods, the reporting module 201d of the operations management engine 201 broadcasts and alerts relevant teams without indicating an actual fleet number of the GSE allocated. In another embodiment where the operations management engine 201 interfaces with the allocation systems or GSE allocation using the operations management engine 201, the operations management engine 201 provides a confirmation on whether the actual GSE that has been allocated for the flight is present at the required location at the required time.

In another embodiment, the data analytics and monitoring module 201b, in communication with the fuel management system 314 via the network 311, automatically acquires fueling data comprising quantity of fuel dispensed to any of the assets 202 and manages financial transactions associated with the fueling data. In another embodiment, the reporting module 201d triggers alerts associated with the data elements and the assets 202 for notifying the entities 203 to initiate proactive mitigation and recovery actions. In another embodiment, the data analytics and monitoring module 201b, in communication with a billing management system 313 via the network 311, electronically acquires and processes billing information for operations external to standard service-level agreements. In an embodiment, the reporting module 201d generates reports with key performance indicators, for example, on one or more of operator performance, operator behavior, the actions performed, operator productivity, and compliance to standards.

The map interface generation module 201c generates 104 an interactive, graphical map interface configured to render a visual representation of the assets 202, a geography containing the assets 202, the operations associated with the assets 202, and the determined data elements in one or more of multiple visual configurations in real time for real-time monitoring and facilitating execution of the determined actions associated with the operations and the assets 202 as disclosed in the detailed description of FIG. 1 and FIGS. 7A-7C. In an embodiment, the operations management engine 201 is configured to interface with multiple operational systems 312, 313, 314, and 315 to render supplementary information associated with the assets 202 on the interactive, graphical map interface. The operational systems comprise, for example, the maintenance management system 312, the billing management system 313, the fuel management system 314, and other operational systems 315 such as an operations database, resource management systems, contracts and billing systems, a training and operator licensing system, etc. The fuel management system 314, in communication with the data analytics and an module 201b of the operations management engine 201, implements fuel level monitoring, provides a pro-active refueling process, and automatically captures the quantity of fuel dispensed to an asset. The fuel management system 314 also provides data required to capture financial transactions, for example, booking the cost of fuel dispensed to the assets 202 and operating department/location to the operations management engine 201 via the network 311. The data analytics and monitoring module 201b receives this data from the fuel management system 314 and executes finance operations in the system 200. In communication with fuel level sensors, the data analytics and monitoring, module 201b allows a fuel station supervisor or attendant to locate an asset 202 in need of refueling. The operations management engine 201 transmits the location information of the asset 202 to the fuel management system 314 via the network 311. The fuel management system 314 uses the location information to dispatch a refueling team to the precisely known location, thereby reducing the time to locate the assets 202 and check fuel status and eliminating unnecessary refueling tasks. The data analytics and monitoring module 201b determines when an actual fuel level reaches the preset percentage. The reporting module 201d, in communication with the data analytics and monitoring module 201b, triggers alerts when the actual fuel level reaches the preset percentage and transmits notifications to relevant entities 203 for action. The reporting module 201d uses various methods, for example, electronic mail, short message service (SMS) messages, chat applications, etc., to notify relevant entities 203, for example, stakeholders and team members when alerts are triggered.

The operations management engine 201 also interfaces with the billing management system 313 via the network 311 for electronically capturing billing data, accurate to the last minute or event, for any services outside the standard service-level agreements (SLAs). The billing data comprises, for example, flight number, airline details, tail/registration number, estimated time of arrival (ETA), expected time of departure (ETD), actual time of arrival (ATA), actual time of departure (ATD), aircraft stand, service type, asset type, asset number, service start time, service end time, etc. An SLA such as a ground handling agreement (GHA) between a service provider and an airline lists the various services required and the associated charges. There are standard services involved in an aircraft turnaround and these services are bundled together with a single charge. Some of the services are based on request on the day of operations. These services comprise, for example, provisioning of a ground power unit and an air conditioning unit. The provision of service is captured by the telematics and tracking device by identifying the asset status and operating status. The operating status is derived from a control circuit element of the asset, which is engaged to provide, for example, 110 volts (V)/400 Hertz (Hz) power in the case of the ground power unit or pre-conditioned air in the case of the air conditioning unit. An operator assigned to operate the asset controls the switching of this control circuit element. The GHA lists the manner in which these services will be charged. These services are charged based on type of service and duration of usage. The operations management engine 201 retrieves and collates relevant information associated with the rendering of these services from a data store and transmits the collated information to the billing management system 313. The information associated with the rendering of these services comprises, for example, the date; the start and end timings; the aircraft stand location; the type of service from the asset type; the unique identifier of the asset allocated for the flight, which is retrieved from an allocation system or by linking the asset location with the aircraft stand using geofencing rules; flight information such as airline, flight number, aircraft type, etc. The operations management engine 201, in communication with the billing management system 313, eliminates data discrepancies and internal delays until invoicing to a customer, thereby adding positively to both cash flow and bottom line.

The maintenance management system 312 executes multiple functions, for example, work order management, inventory management, maintenance cost capture, service desk, resource allocation, reliability analysis, dashboard generation, and service-level agreement (SLA) monitoring, in communication with the operations management engine 201 via the network 311. The maintenance management system 312 provides real-time information about the condition of each individual asset through the asset data comprising, for example, telemetric or internet-of-things (IoT) data and captures machine asset hours, for example, engine hours, electronically. The maintenance management system 312 transmits the captured machine asset hours to the operations management engine 201 via the network 311 for forecasting the next preventive maintenance interval. The operations management engine 201 forecasts the next preventive maintenance interval using the engine hours. Based on the individual utilization pattern of each asset 202, the operations management engine 201 automatically calculates the due date for the next preventive maintenance job, inspection, or any other planned workshop activity, thereby ensuring that mobile assets are not over or under maintained. By seamlessly interfacing to the maintenance management system 312, the operations management engine 201 automates preventive maintenance planning and scheduling. The reporting module 201 generates a maintenance forecast report using maintenance interval data exemplarily illustrated in the table below.

| | Maintenance Interval | |
|---|---|---|
| S # | GSE Type | Maintenance Interval in Hours |
| 1 | Type 1 | 250 |
| 2 | Type 2 | 500 |
| 3 | Type 3 | 300 |

The maintenance forecast report comprises, for example, asset number, asset type, maintenance interval in hours, last maintenance date, engine hours at last maintenance, average hours per day, next maintenance due at engine hours, engine hours as of today, hours to go for the next maintenance, number of days to go for the next maintenance, next maintenance due date, and difference between today and last maintenance date. In an embodiment, the reporting module 201d transmits the maintenance forecast report to the maintenance management system 312 for maintenance scheduling. In an embodiment, the operations management engine 201 processes telemetric data contained in the asset data to implement a condition monitoring strategy on all mobile assets. In an embodiment, limit signals from the assets 202 are interfaced to the reporting module 201d which in turn, generates and renders notifications to alert maintenance and operations teams. For example, when a signal for engine overheating, low oil pressure or any other malfunction is triggered, the reporting module 201d alerts the rapid response maintenance team about the fault, the asset 202, and the location of the asset 202.

The operations management engine 201 interfaces with other operational systems 315, for example, an operations database, resource management systems, and a training and operator licensing system via the network 311. The operations database stores supplementary information, for example, flight information comprising flight number, airline, tail number, stand/bay details, ETA/ETD, ATA/ATD, etc. The operations management engine 201 communicates with the operations database to render the supplementary information on the interactive, graphical map interface. In conjunction with the interface to the resource management systems, the operations management engine 201 digitally renders the complete turnaround operation for visualization on the interactive, graphical map interface. In an example, interfacing with the operations database and the resource management systems allows monitoring of all relevant activities involved with aircraft ground handling operations in real time, proactive identification of service delivery failures, and initiation of corrective measures or actions.

The operations management engine 201 interfaces with the resource management systems for allowing allocators to identify best fit assets to be allocated for flights rather than relying on other means of communication or manual tracking. This allocation support results in reduced fuel consumption and maintenance costs. Moreover, the operations management engine 201, in communication with the resource management systems, provides complete transparency within ramp operations of various GSE based on location and status. The operations management engine 201, in communication with the resource management systems, facilitate decision making support in case of any variance from set engagement standards. Furthermore, the operations management engine 201, in communication with the resource management systems, measures, monitors, and reports in real time on engagement standards linked to SLAs with customers.

In an embodiment, the billing management system 313 is configured as a contracts and billing system. The combination of real-tire location and equipment status tracking and the interface with the operations database and the resource management systems provide data required to confirm the provision of services, for example, catering off-loading/loading completion, provisioning of air conditioning units, ground power units, etc., completion of baggage/cargo off-loading/loading, pushback completion, etc. This data on completion of service by type of service provides the information required for billing purposes. The operations management engine 201 interfaces with the billing management system 313 far automated billing using the billing information. In an embodiment, the operations management engine 201 interfaces with the billing management system 313 for ensuring licenses, for example, mobile asset airport licenses, are renewed by airport operators automatically. The operations management engine 201 interfaces with the training and operator licensing system to ensure that assets 202, for example, the motorized equipment, is operated only by trained operators with valid and authorized licenses, thereby allowing operators, for example, airport operators, to monitor the driving behavior of driving operators for each entity 203, that is, stakeholders and service providers, while ensuring a safe and secure operation.

The processor 306 retrieves instructions defined by the data collection module 201a, the data analytics and monitoring module 201b, the map interface generation module 201c, the reporting module 201d, and the access control module 201e of the operations management engine 201 from the memory unit 305 for performing respective functions disclosed above. The data collection module 201a, the data analytics and monitoring module 201b, the map interface generation module 201c, the reporting module 201d, and the access control module 201e of the operations management engine 201 are disclosed above as software executed by the processor 306. In an embodiment, the modules, for example, 201a, 201b, 201c, 201d, 201e, etc., of the operations management engine 201 are implemented completely in hardware. In another embodiment, the modules, for example, 201a, 201b, 201c, 201d, 201e, etc., of the operations management engine 201 are implemented by logic circuits to carry out their respective functions disclosed above. In another embodiment, the operations management engine 201 is also implemented as a combination of hardware and software and one or more processors, for example, 306, that are used to implement the modules, for example, 201a, 201b, 201c, 201d, 201e, etc., of the operations management engine 201.

For purposes of illustration, the detailed description refers to the modules, for example, 201a, 201b, 201c, 201d, 201e, 201f, etc., of the operations management engine 201 being run locally on a single computing device 304; however the scope of the system 200 and the method disclosed herein is not limited to the modules, for example, 201a, 201b, 201c, 201d, 201e, 201f, etc., of the operations management engine 201 being run locally on a single computing device 304 via the operating system and the processor 306, but may be extended to run remotely over the network 311 by employing a web browser and a remote server, a mobile phone, or other electronic devices. In an embodiment, one or more portions of the system 200 disclosed herein are distributed across one or more computer systems (not shown) coupled to the network 311.

The non-transitory, computer-readable storage medium disclosed herein stores computer program instructions executable by the processor 306 for managing operations and assets 202 associated with multiple entities 203. The computer program instructions implement the processes of various embodiments disclosed above and perform additional steps that may be required and contemplated for managing operations and assets 202 associated with multiple entities 203. When the computer program instructions are executed by the processor 306, the computer program instructions cause the processor 306 to perform the steps of the method for managing operations and assets 202 associated with multiple entities 203 as disclosed in the detailed descriptions of FIGS. 1-3. In an embodiment, a single piece of computer program code comprising computer program instructions performs one or more steps of the method disclosed in the detailed descriptions of FIGS. 1-3. The processor 306 retrieves these computer program instructions and executes them.

A module, or an engine, or a unit, as used herein, refers to any combination of hardware, software, and/or firmware. As an example, a module, or an engine, or a unit includes hardware, such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. In an embodiment, the computer program codes comprising computer readable and executable instructions are implemented in any programming language, for example, C#, Node.js® of Joyent, Inc., Python®, Visual Basic®, etc. In another embodiment, other object-oriented, functional, scripting, and/or logical programming languages are also used. In an embodiment, the computer program codes or software programs are stored on or in one or more mediums as object code. In another embodiment, the term "module" or "engine" or "unit" refers to the combination of the microcontroller and the non-transitory, computer-readable storage medium. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

Figure 4A:
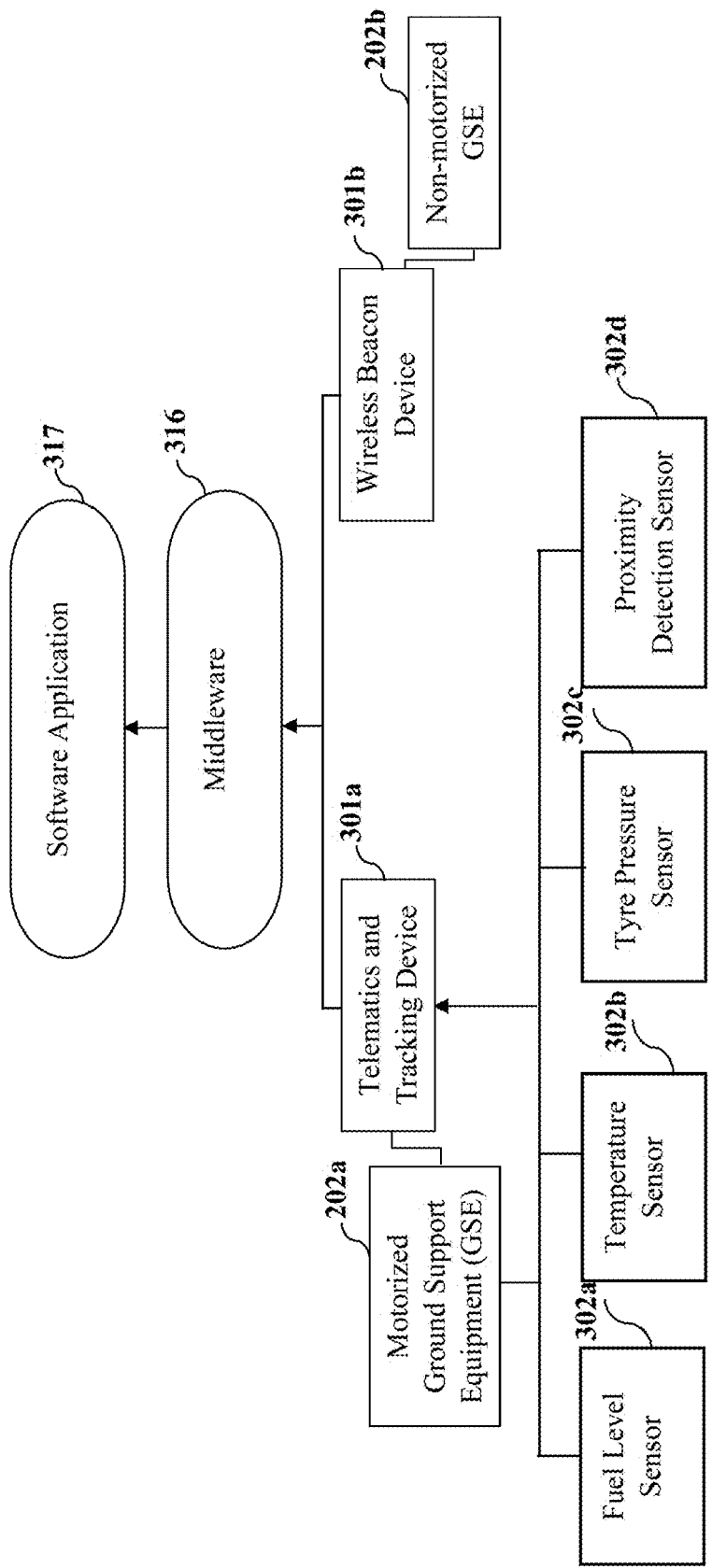
FIGS. 4A-4B illustrate block diagrams of a system architecture, showing communication between tracking devices, sensors, and components of an operations management engine for managing ground handling operations and assets associated with multiple entities, according to an embodiment herein.
Figure 4B:
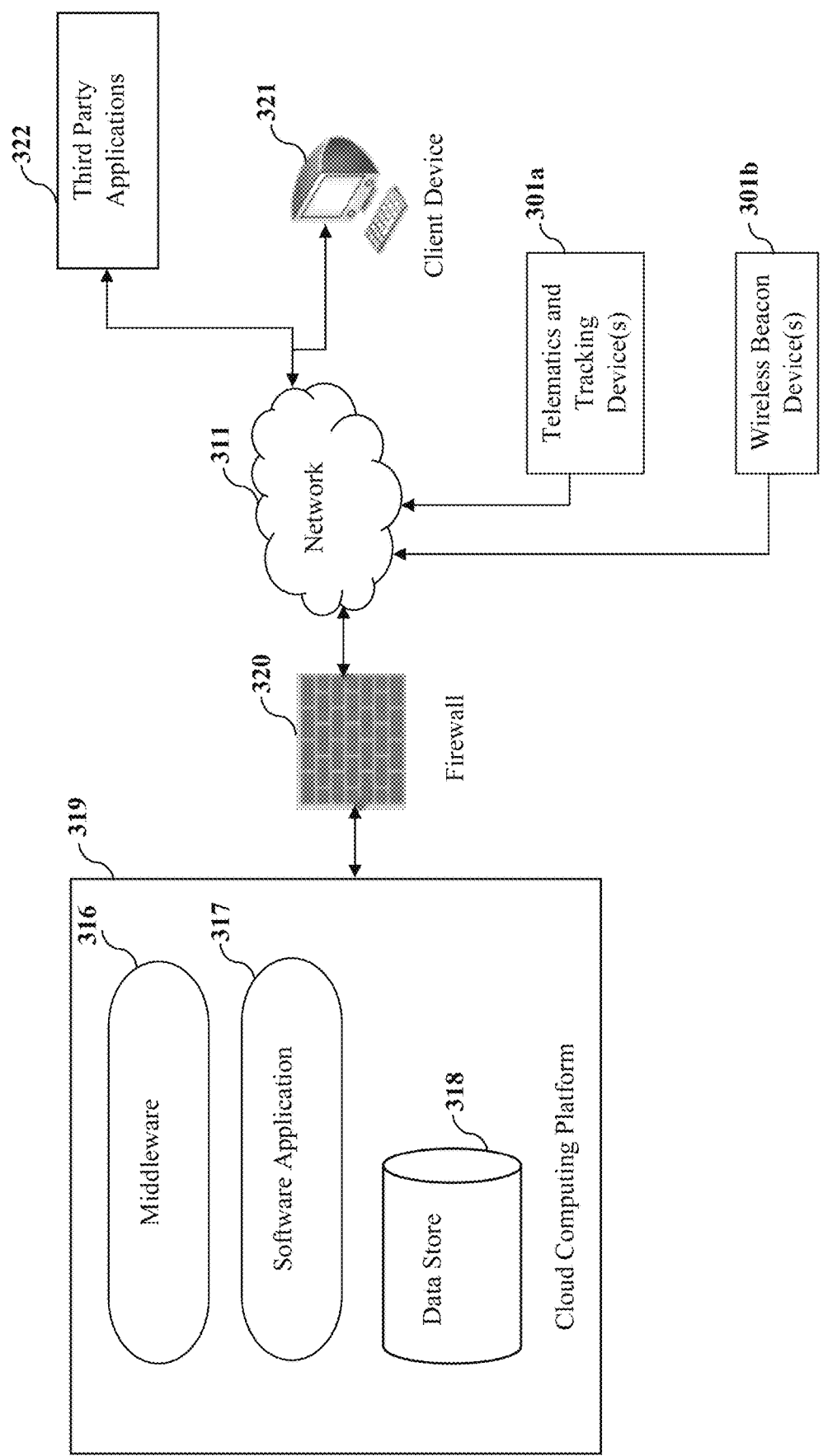

FIGS. 4A-4B illustrate block diagrams of a system architecture, showing communication between tracking devices 301a and 301b, sensors 302a, 302b, 302c, and 302d, and components of the operations management engine for managing ground handling operations and assets associated with multiple entities, according to an embodiment herein. FIG. 4A illustrates deployment of tracking devices 301a and 301b on the assets, for example, motorized ground support equipment (GSE) 202a and non-motorized GSE 202b respectively, and operable coupling thereof to middleware 316 and a software application 317. In an embodiment, the operations management engine is implemented as a software application 317, for example, a web application or a mobile application. The tracking devices comprise a telematics and tracking device 301a installed or the motorized GSE 202a and a wireless beacon device 301b in operable communication with the non-motorized GSE 202b. In an embodiment, the telematics and tracking device 301a and the wireless beacon device 301b are configured as internet-of-things (IoT) devices that transmit data over a network 311, for example, the internet, as exemplarily illustrated in FIG. 4B. In an exemplary implementation illustrated in FIG. 4A, one or more sensors, for example, a fuel level sensor 302a, a temperature sensor 302b, a tyre pressure sensor 302c, and a proximity detection sensor 302d, are operably coupled to the motorized GSE 202a and in turn, interfaced to the telematics and tracking device 301a. The telematics and tracking device 301a receives operating parameters of the motorized GSE 202a in the form of signals from the sensors 302a, 302b, 302c, and 302d and generates asset data therefrom. The wireless beacon device 301b is, for example, a Bluetooth low Energy (BLE) reader installed on a mobile asset, for example, a tractor, used to tow the non-motorized GSE 202b to which a BLE tag is attached. The wireless beacon device 301b receives signals transmitted by the BLE tag. The signals from the BLE tag comprise location data, asset data, and/or operating parameters of the non-motorized GSE 202b.

In an embodiment as exemplarily illustrated in FIG. 4B, the operations management engine is hosted on a website or a cloud computing platform 319, for example, Azure® of Microsoft Corporation, AWS® of Amazon Technologies, Inc., etc. The cloud computing platform 319 hosts the middleware 316, the software application 317, and a data store 318. The cloud computing platform 319 receives the asset data and/or the operating parameters from the telematics and tracking device 301a installed on the motorized GSE 202a and the wireless beacon device 301b associated with the non-motorized GSE 202b via the network 311. In an embodiment, the asset data and/or the operational parameters received via the network 311 is transmitted to the cloud computing platform 319 via a firewall 320. The operations management engine processes logical combinations of the received asset data and/or the operating parameters and dynamically determines multiple data elements of the motorized GSE 202a and the non-motorized GSE 202b as disclosed in the detailed description of FIGS. 1-3. The operations management engine generates an interactive, graphical map interface, for example, a digitized airport map, configured to render a visual representation of the motorized GSE 202a and the non-motorized GSE 202b, a geography containing the motorized GSE 202a and the non-motorized GSE 202b, the operations associated with the motorized GSE 202a and the non-motorized GSE 202b, and the determined data elements in one or more visual configurations in real time for real-time monitoring and facilitating execution of the determined actions associated with the operations and the assets. An operator or a user may access the interactive, graphical map interface using a client device 321. The operations management engine is configured to interface with third party applications 322, for example, resource management systems, flight information systems, and other operational systems to receive and render supplementary information associated with the assets on the interactive, graphical map interface.

The operations management engine logically interprets signals from the IoT devices, that is, the telematics and tracking device(s) 301a and the wireless beacon device(s) 301b, to determine various statuses and render relevant information, for example, the data elements, in an easy to understand, intuitive, and visual manner. The operations management engine renders the information on the interactive, graphical map interface to provide a real-time visualization of the equipment and the status. The middleware 316 analyzes and interprets signal conditions of the motorized GSE 202a and the non-motorized GSE 202b collected by the to IoT devices 301a and 301b respectively, while the software application 317 determines data elements comprising the relevant statuses, for example, the power on/off status, availability, drive status, work status, standby status, and service status of the motorized GSE 202a and the non-motorized GSE 202b using relevant logical combinations. For each unique combination of asset make and model, the software application 317 generates a specification report defining the various statuses and the logical combinations of the input signals that lead to each status.

The software application 317 determines the location of the motorized GSE 202a using location data tracked and transmitted by a global positioning system (GPS) module deployed in the telematics and tracking device(s) 301a, thereby facilitating monitoring of the location of the motorized GSE 202a. The software application 317 determines the location of the non-motorized GSE 202b using location data received from the signals transmitted by the wireless beacon device(s) 301b from wireless beacon tags attached to the non-motorized GSE 202b. In an embodiment, the signals transmitted by the wireless beacon device(s) 301b are received by the telematics and tracking device(s) 301a and using the signal strength and the GPS module of the telematics and tracking device(s) 301a, the software application 317 determines the location of the non-motorized GSE 202b. The software application 317 renders the locations of the motorized GSE 202a and the non-motorized GSE 202b in real time on the interactive, graphical map interface. The software application 317 determines a power on status for a value-added function, where an asset is allocated for a task and used for execution of the task. The software application 317 determines a power on status for a non-value-added function, where an asset is not allocated for a task, but the asset is in an idling mode, that is, powered on and no function is being performed. The software application 317 determines an availability status when an asset is not in use and can be assigned with a task. The software application 317 determines a drive status when an asset is in motion, that is, being driven. The software application 317 determines a work status when an asset is executing its configured function when allocated. The software application 317 determines a standby status when an asset is in-between statuses for a predetermined period of time. The software application 317 determines an "out-of-service" status when an asset is under maintenance.

The software application 317 monitors health of the asset using signals from the sensors and control systems of the asset. For example, the software application 317 monitors the status of a low-pressure sensing switch of an aircraft engine and uses the change of status from 0 to 1 or 1 to 0 to identify a fault. In another example, the software application 317 monitors the status of a coolant temperature sensor to identify a high coolant temperature condition. The software application 317 processes the change in the status of these sensors to determine the health of the asset. Based on the logical interpretation of the statuses, the software application 317 generates and triggers alerts. The software application 317 analyzes signals from the fuel level sensors coupled to the assets to monitor the level of fuel in a fuel tank. Based on preconfigured rules, the software application 317 generates and triggers low fuel level alerts. The software application 317 renders the level of fuel in the fuel tank as a percentage of the fuel tank capacity on a graphical user interface. If the asset does not have a fuel level sensor, an appropriate sensor is installed as part of the system to monitor the fuel level. The software application 317 analyzes the rate of change of GPS coordinates for determining the speed at which an asset is moving. Based on preconfigured rules, the software application 317 generates and triggers overspeeding alerts. The software application 317 also analyzes accelerometer data received from an accelerometer in the telematics and tracking device(s) 301a for determining operator or driver behavior associated, for example, with harsh acceleration, harsh braking, harsh cornering, etc. The software application 317 compares G-force values generated by the accelerometer against an asset type-specific threshold value to interpret harsh acceleration, harsh braking, and harsh cornering. The software application 317 identifies driving behavior by interpreting the g-force values.

FIG. 5 exemplarily illustrates a tabular representation of data elements, for example, asset requirements, determined by the operations management engine for determining actions associated with the assets to be executed, according to an embodiment herein. In a multi-entity environment such as an airport environment, assets such as ground support equipment (GSE) are required for aircraft turnaround and are typically handled by a ground handling organization contracted by an airline at an airport. Asset requirements and engagement standards are governed by inclusions in a ground handling agreement (GHA) made between the airline and a service provider. The type of asset is dependent on compatibility of the asset with the type of aircraft. Consider an example where the type of aircraft is a Boeing 737 family, narrow bodied aircraft; the type of flight is "turnaround"; ground time is 70 minutes; and GHA inclusions comprise engagement standards for aircraft turnaround classified by resource type, duration of requirement, count of assets needed, and start time and end time of requirement with respect to arrival and departure times.

The operations management engine acquires multiple datasets from one or more operational systems. For example, the operations management engine acquires master data comprising details of the assets such as asset type, make or model, an asset identifier, and aircraft compatibility from an operational system. Moreover, the operations management engine acquires flight schedule information comprising, for example, aircraft type, arrival and departure timings, airline, aircraft parking stand details such as contact or remote stand, type of flight such as turnaround, arriving, departing, freighter, etc., from another operational system. Furthermore, the operations management engine acquires aircraft stand details comprising, for example, an identifier and classification as arrival or remote from another operational system. Using the acquired information, the operations management engine determines and renders asset requirements as exemplarily illustrated in FIG. 5. Based on the determined asset requirements, the operations management engine identifies optimal assets from among multiple assets to be allocated for tasks associated with ground handling operations. For example, the operations management engine identifies the best fit asset closest to the aircraft stand that would be available at the time of requirement to deliver a service. The operations management engine then allocates details of the identified asset, for example, a unique identifier of the identified asset for the task. In an embodiment, the operations management engine passes the details of the identified asset to a resource allocation system via an interface. FIG. 5 also illustrates data elements determined by the operations management engine for forecasting a type and a count of each of the assets required to handle each ground handling operation.

FIGS. 6A-6D exemplarily illustrate tabular representations of data elements determined by the operations management engine for forecasting dates for a next due maintenance, according to an embodiment herein. The telematics and tracking device operably coupled to an asset records running hours of the asset when the asset is switched on. The operations management engine receives the recorded running hours from the telematics and tracking, device and calculates the average running hours per da which is the basis of establishing the next planned maintenance job. Planned maintenance jobs are performed at defined engine hour intervals. FIG. 6A exemplarily illustrates a tabular representation of types on maintenance checks and when these checks have to be carried out based on an engine hour reading. The table exemplarily illustrated in FIG. 6A indicates that a check is required, for example, at every 500-hour interval with the type of maintenance check determined by the engine hour reading.

The operations management engine acquires multiple datasets from one or more operational systems. For example, the operations management engine acquires master data comprising a maintenance interval in engine hours for each asset, the type of maintenance checks, and the corresponding engine hour value from an operational system, for example, a maintenance management system. The operations management engine also retrieves the last planned maintenance details that were updated as part of the system configuration from the maintenance management system. The last planned maintenance details comprise, for example, the date on which the last maintenance was carried out, the engine hour on that date, and the type of maintenance check as illustrated in FIG. 6B. Consider an example where the operations management engine receives information comprising an asset identifier as "LDL 001"; an asset type as "Lower Deck Loader (LDL)"; types of maintenance as exemplarily illustrated in FIG. 6A; and a maintenance interval as 500 hours. The operations management engine accepts a tolerance of +/−10% of engine hours. Based on the information received, the operations management engine determines the next planned maintenance due, for example, at: Engine hours @ last planned maintenance+Maintenance interval engine hours=1075+500=1,575. The operations management engine creates a maintenance pattern as tabulated in FIG. 6C. Based on the utilization of the asset in operation and the logging of engine hours whenever the engine is on, the operations management engine calculates the average engine hours per day. The operations management engine determines forecasted dates for the next due maintenance based on different values for average engine hours per day based on the utilization pattern as exemplarily illustrated in FIG. 6D.

FIGS. 7A-7B exemplarily illustrate screenshots of an interactive, graphical map interface 701 generated by the operations management engine for real-time monitoring and facilitating execution of actions associated with ground handling operations, according to an embodiment herein. The operations management engine generates an interactive, graphical map interface 701 configured to render a visual representation of the assets, a geography containing the assets, the operations associated with the assets, and the determined data elements in one or more visual configurations in real time for real-time monitoring and facilitating execution of the determined actions associated with the operations and the assets. In an exemplary implementation in an airport environment, the operations management engine configures the interactive, graphical map interface 701 as a digitized airport map as illustrated in FIGS. 7A-7B. The digitized airport map provides an interactive digitized visualization of the airport and airport geography with landmark names aligned to operational terminology of the airport or a client. The digitized airport map allows distance measurement; renders a representation of latitude, longitude, and Cartesian coordinates; captures and display routes used by asset; permits playback; implements pre-built and user-definable geofencing either by coordinate selection or drag and drop; allows configuration of geofencing names by users; allows geofencing unique to a creator; and provides availability of pre-built geofences to all users. The digitized airport map flags discrepancies and issues in a visual manner allowing quick identification and facilitates proactive action for service recovery. The digitized airport map is configurable based on user roles and responsibilities. The digitized airport map also allows a user to configure discrepancies and issues to fit a user role. The digitized airport map further implements right and left click anchor tap elements for displaying additional information, that is, user-configurable. In an embodiment, the digitized airport map implements a hover function where hovering over any asset icon on the digitized airport map throws up a pop-up window 702 that provides additional information useful for monitoring the operations as exemplarily illustrated in FIG. 7B. The interactive, graphical map interface 701 is a digitized version of the airport map with the naming conventions for landmarks and locations based on the conventions and practices followed in individual airports.

The digitized airport map allows visualization of all assets, for example, ground support equipment (GSE) in real time. The digitized airport map allows selective action, for example, by allowing a user to assign an operator to a GSE for a defined period; assign the GSE to a flight; mark status of the GSE only to "unserviceable" or "serviceable" with reasons; and assign a flight to a gate or a stand. The digitized airport map flags a GSE that is not used for a defined period in a distinctly visible manner. The operations management engine allows the information rendered on the digitized airport map to be filtered using multiple filtering criteria either individually or as a combination. The filtering criteria comprise, for example, flight number, aircraft stand or gate or parking bay, asset type, individual asset identifier, geofence locations, airline, individual asset, location or department, operator or driver, violations by type such as overspeeding, harsh driving, geofence violations, etc., fuel level, asset health condition, asset status, operating status, device health status, etc. The digitized airport map also displays indications of ad hoc service provisions, over speeding, operator behavior, faults of the GSE, faults of the operations management engine, GSE due for preventative maintenance (PM) within a defined period, GSE unserviceable and/or GSE not used for a defined period, etc. The operations management engine allows single or multiple filter selections on the digitized airport map. The operations management engine implements view restrictions of the digitized airport map based on user profile. The operations management engine renders the statuses of the assets on the digitized airport map and application components using different colored interface elements such as icons. The operations management engine also displays the actual location of the assets and their operating statuses on the digitized airport map using an operational language.

The operations management engine provides a graphical representation of individual aircraft handling processes on the digitized airport map in real time while also enabling historical data analysis. The operations management engine caters to the visualization of relevant flight data linked to each aircraft stand or bay, when interfaced with relevant operating systems. The digitized airport map is deployable on mobile devices, thereby allowing the relevant entities, for example, role holders such as turnaround coordinators to monitor the deployment of allocated assets in real time, initiate corrective action in case of any exceptions, and mitigate or minimize possible delays or variation from engagement standards.

FIG. 7C exemplarily illustrates an interface element 703 displayed on an interactive, graphical map interface generated by the operations management engine for indicating asset status and operating status of an asset, according to an embodiment herein. In an embodiment, the operations management engine represents assets by distinctive interface elements 703, for example, icons, that enable identification of the asset type and its function at a glance. Motorized equipment icons have, for example, color elements that indicate the asset and operating statuses as exemplarily illustrated in FIG. 7C. For example, for indicating the operating status, the color green indicates an asset is available for the next assignment, the color brown indicates a work mode status, the color blue indicates a standby status, the color red indicates an out-of-service status, etc. In another example, for indicating the asset status, the color green indicates "engine off", the color yellow indicates "engine on", and the color red indicates "engine on—idling".

FIG. 8 exemplarily illustrates a screenshot of a graphical user interface (GUI) 801 rendered by the operations management engine for real-time monitoring of multiple data elements determined by the operations management engine, according to an embodiment herein. The operations management engine determines and monitors the location and status of each asset. The current location of the asset, the operating status of the asset, and the engine status as defined by preconfigured rules in the operations management engine facilitate allocators to identify best fit assets to be assigned for flights that they are responsible for rather than relying on other means of communication or asset tracking. The operations management engine identifies assets based on operational capability, availability, and the location closest to the point of requirement. Operating statuses comprise, for example, available, driving, working, standby, and out-of-service. The engine status identifies value-added engine hours, defined as engine hours required for an operating status and non-value-added engine hours defined as an engine idling duration. Identification of idling hours allows processes to be implemented to reduce these hours leading to reduced fuel consumption and maintenance costs while extending warranty periods.

In addition to monitoring the operating and engine statuses of the asset, the operations management engine also generates and renders an intuitive GUI 801 as exemplarily illustrated in FIG. 8, for monitoring the health of the asset, driving behaviors, fuel level, speed of movement, etc., with an interface element such as a button to reflect an out-of-service status. The GUI 801 also displays the details of the asset, operator, and flight assignment. Statuses are represented using icons that are representative of the function monitored and a change in color of the icon is used to indicate different statuses. The GUI 801 is viewable by users based on their roles and responsibilities. For example, a turnaround coordinator may view the GUI 801 to monitor below-the-wing activities of flights assigned to the turnaround coordinator. Based on real-time events, the turnaround coordinator may initiate an action in case of any discrepancies or issues with service delivery. In other examples: a maintenance coordinator may view the GUI 801 to monitor the health of the equipment in real time; a safety coordinator may view the GUI 801 to monitor safe driving behaviors, while a fueling coordinator may monitor fuel level in real time and arrange a proactive refueling process. By monitoring driving behavior and implementing a replay mode, the operations management engine facilitates reduction in accident-related repair costs. The GUI 801 comprises an interface element for maintenance, for example, a MAINT button configured to allow a user to change the status of the asset to "out-of-service" and assign a reason for maintenance, for example, preventive maintenance, asset breakdown, accident repair, inspection, etc. In an embodiment, the GUI 801 renders a dropdown menu along with the MAINT button to allow a user to select relevant reasons for maintenance. Post completion of the maintenance, the MAINT button allows a user to change the status, for example, to "back-in-service".

FIGS. 9A-9G exemplarily illustrates screenshots of dashboards 901, 902, 903, 904, 905, 906, and 907 rendered by the operations management engine for monitoring, tracking, and managing assets associated with multiple entities, according to an embodiment herein. The operations management engine generates and renders standard reports with an option to configure other reports according to particular requirements. The operations management engine generates the standard reports, for example, in a tabular format or a graphical format, and renders both in real-time as well as historical data captured by the operations management engine. The operations management engine allows configuration of key performance indicators on dashboards for taking action instantly when predefined parameters are reached or have exceeded a critical level. The dashboards are configurable based on the role of the user. The dashboards are user role-specific, where users receive valuable information for their day of operations activities. The dashboards also support long term decision making. One or more reports and dashboard elements, for example, the reports and dashboard elements that reference flights and flight specific activities in an airport environment, depend on interfaces with operating systems.

Figure 9A:
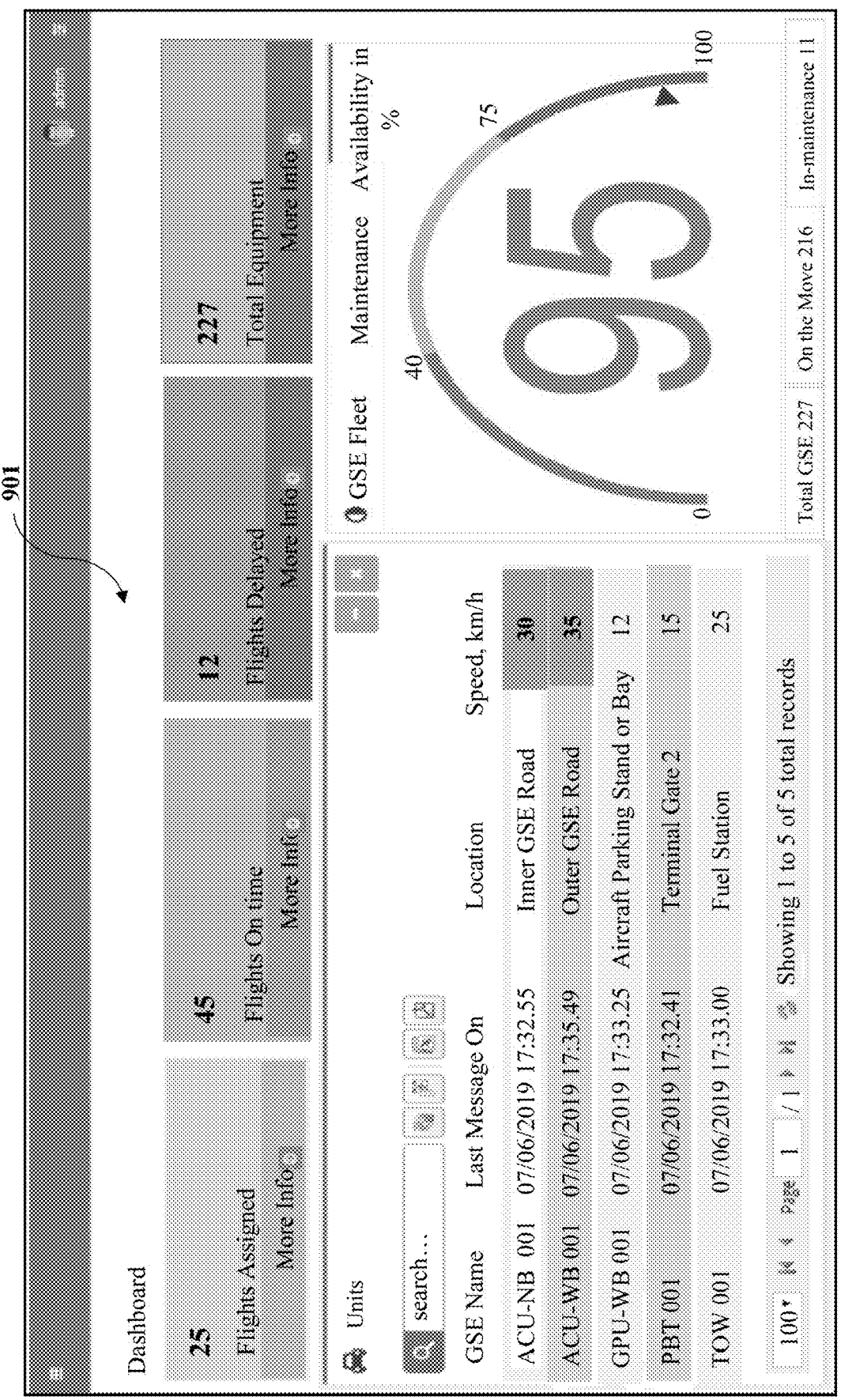
Figure 9B:
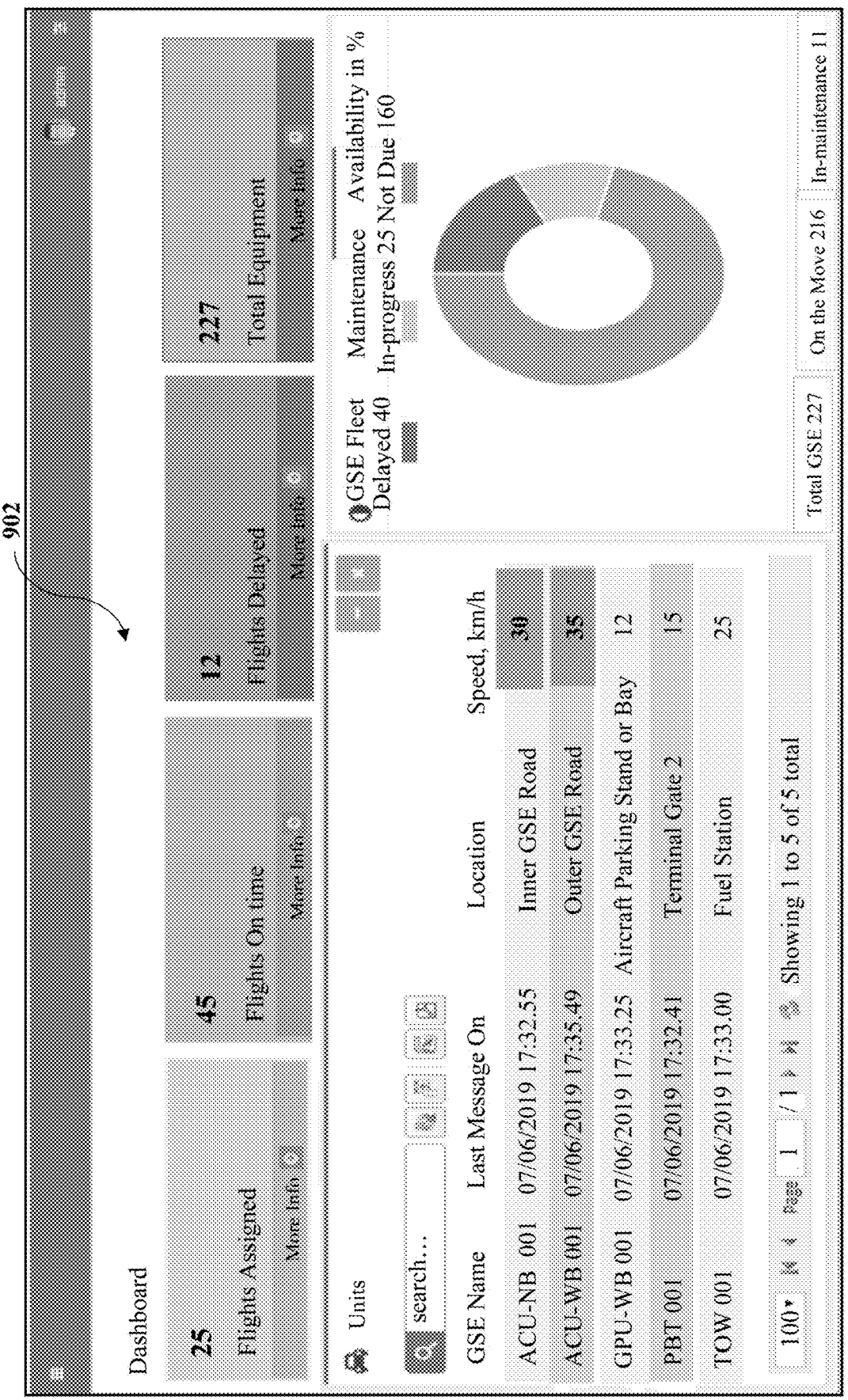
Figure 9C:
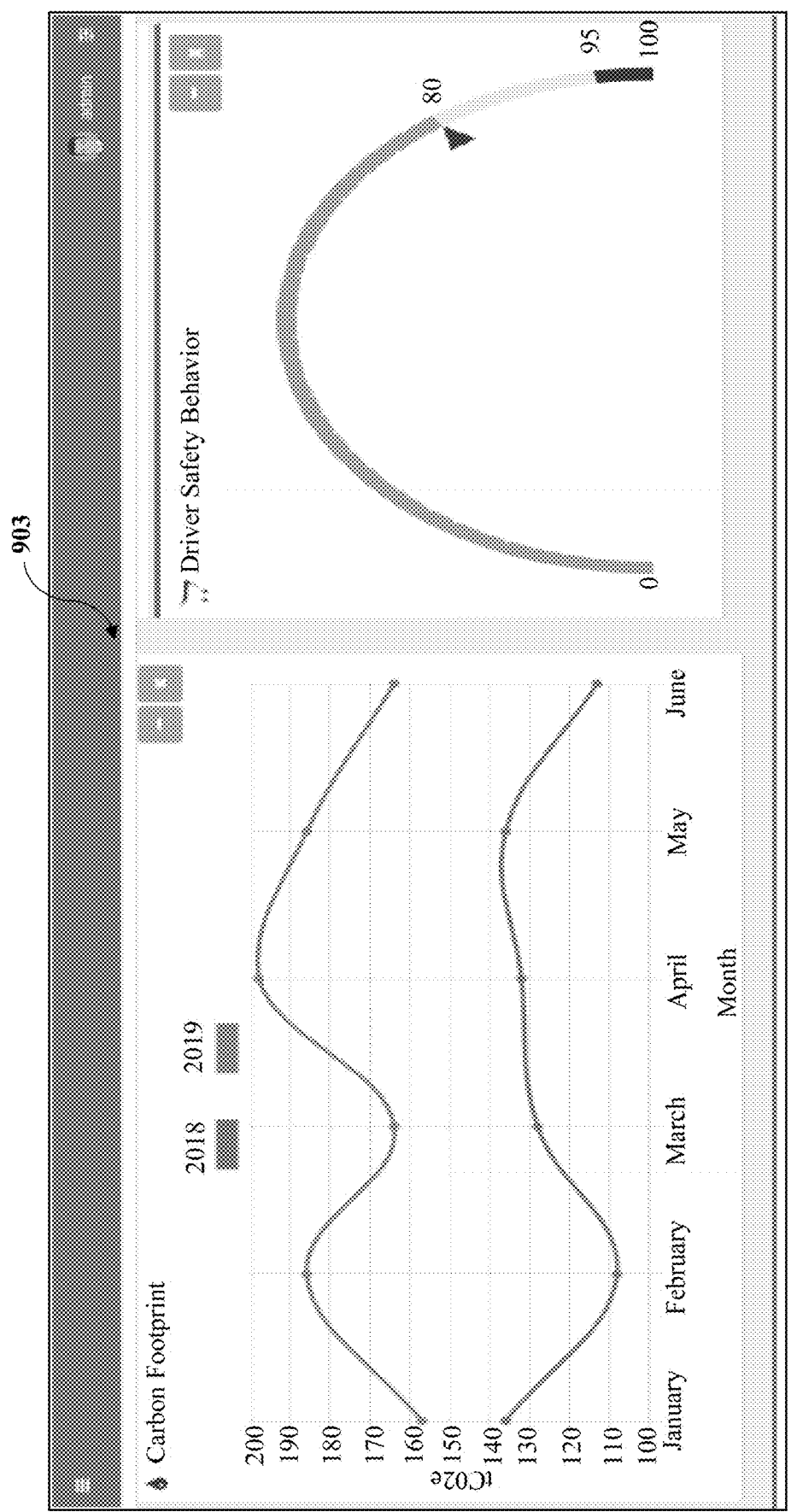

In an embodiment, the operations management engine generates dashboards 901 and 902 configured as a maintenance screen and a turnaround coordination screen as exemplarily illustrated in FIGS. 9A-9B, for displaying information of assets under maintenance, classified by asset type, maintenance type, asset availability, serviceability index, and assets overdue for service, and the status of assets allocated to flights assigned to a user. In another embodiment, the operations management engine generates a dashboard 903 as exemplarily illustrated in FIG. 9C, for displaying a safe operating score of either individual operators or the overall organization based on a speeding profile and harsh driving behavior.

Figure 9D:
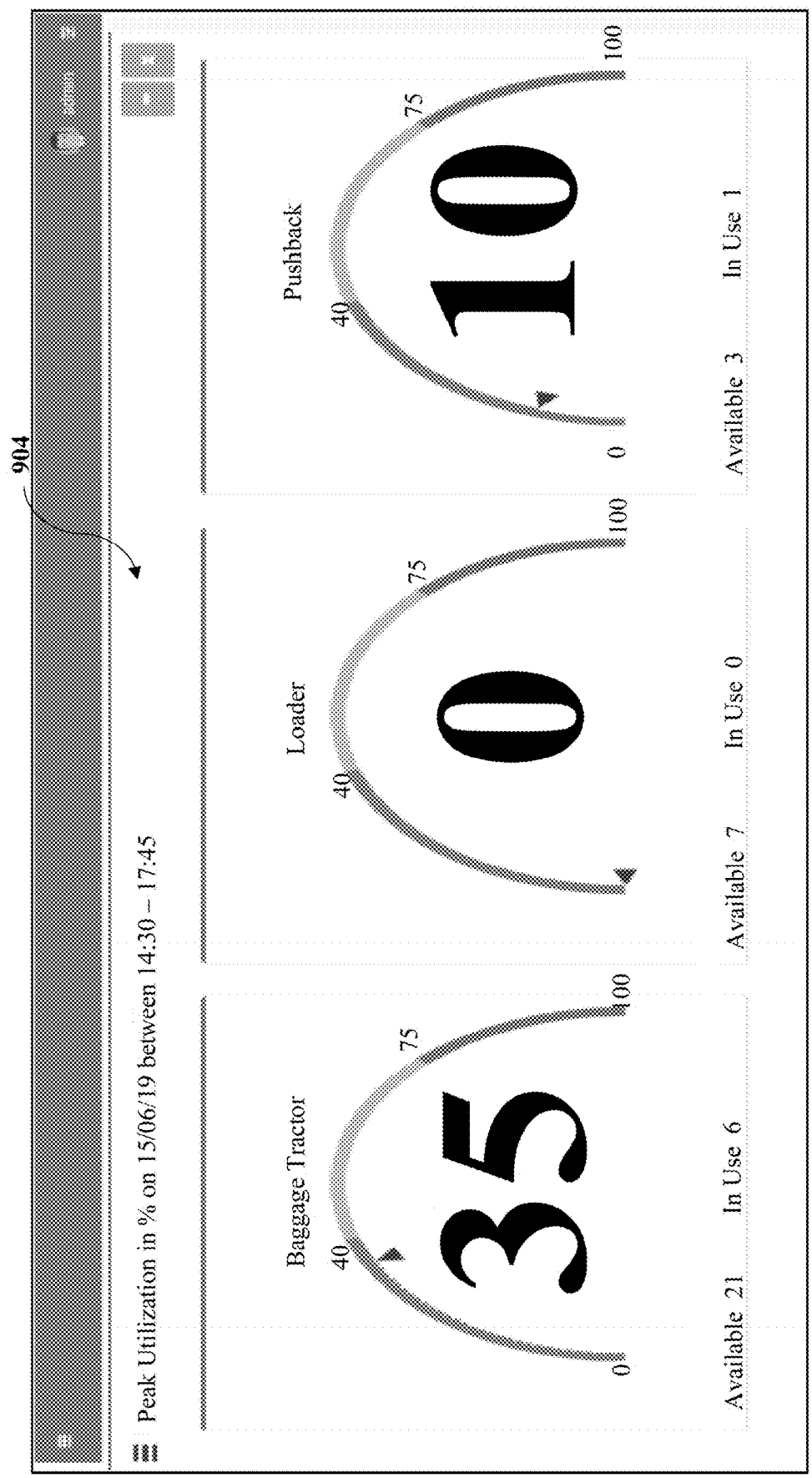
Figure 9F:
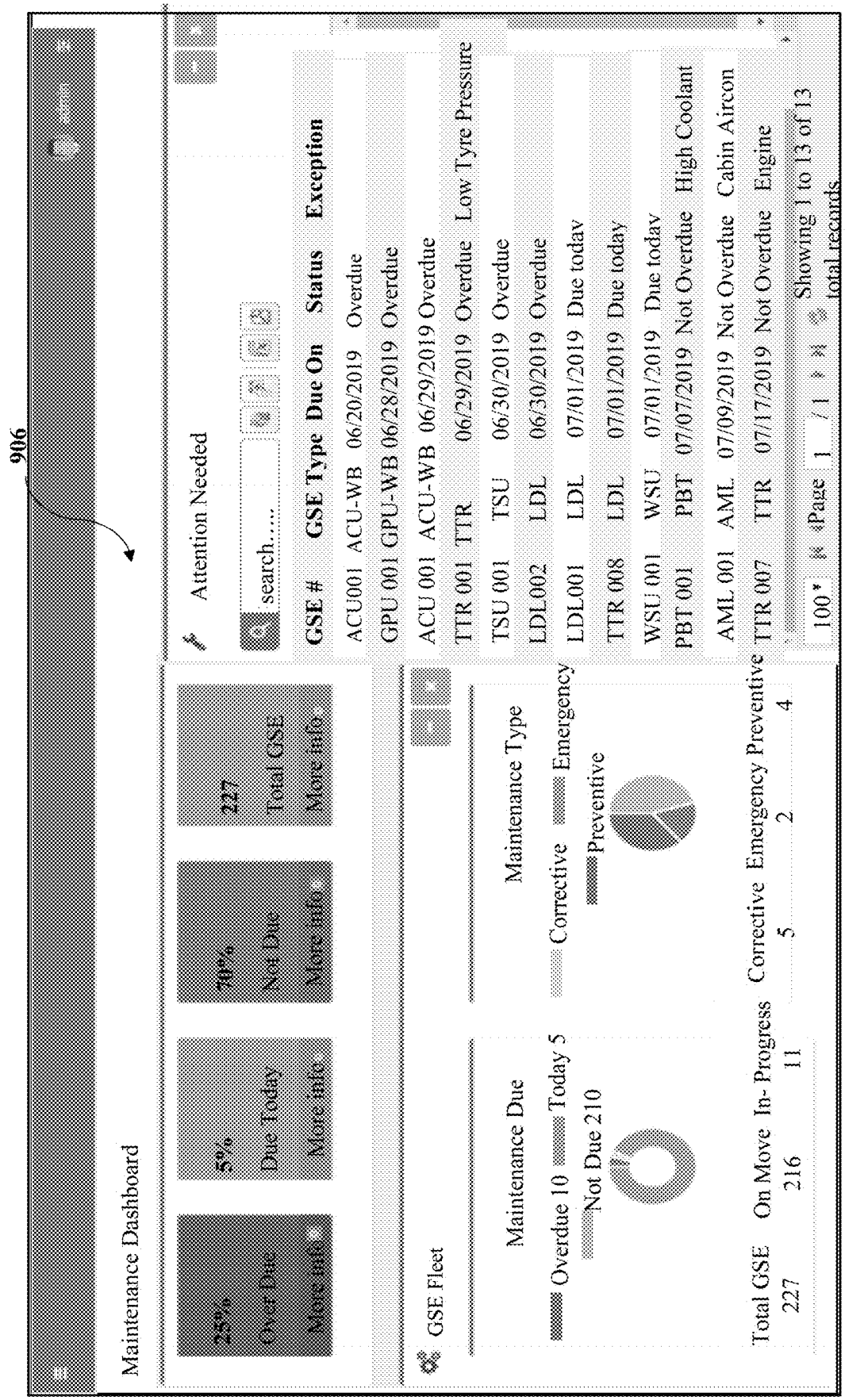
Figure 9G:
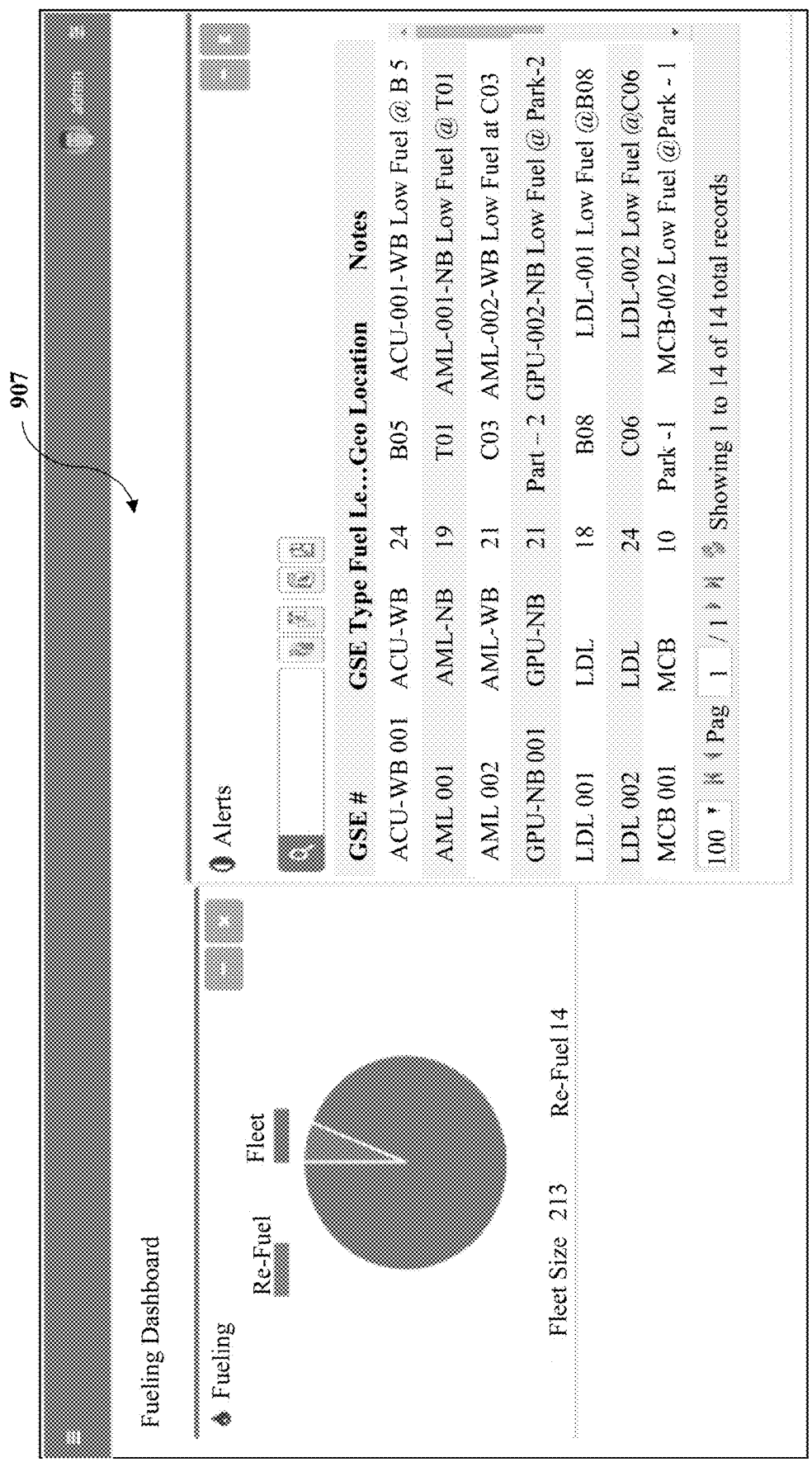

In another embodiment, the operations management engine generates a dashboard 904 as exemplarily illustrated in FIG. 9D, for displaying utilization reports generated based on parameters defined by business processes. These parameters indicate the operating and engine status of the asset. These reports over a period of time identify the number of each asset type in use at the peak period. The operations management engine analyzes these reports to determine the maximum number of assets needed and used during peak operational periods. The operations management engine also analyzes these reports to determine the fleet size needed to meet operational requirements during annual budgeting. Precise analysis of the utilization reports helps in capital avoidance by determining the peak period requirements and effective allocation based on real-time data. The operations management engine also generates other dashboards, for example, a group support equipment (GSE) dashboard 905, a maintenance dashboard 906, and a fueling dashboard 907 as exemplarily illustrated in FIGS. 9E-9G.

Figure 10A:
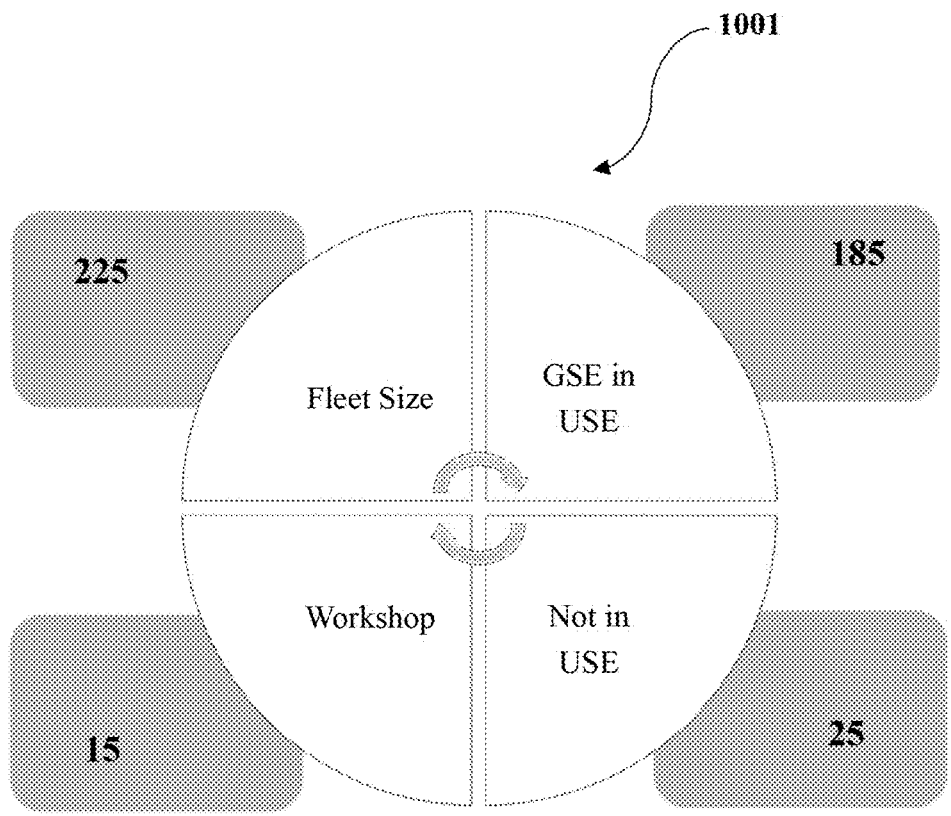
FIGS. 10A-10B exemplarily illustrate screenshots of graphical user interfaces rendered by the operations management engine, displaying day of operations information, according to an embodiment herein.
Figure 10B:
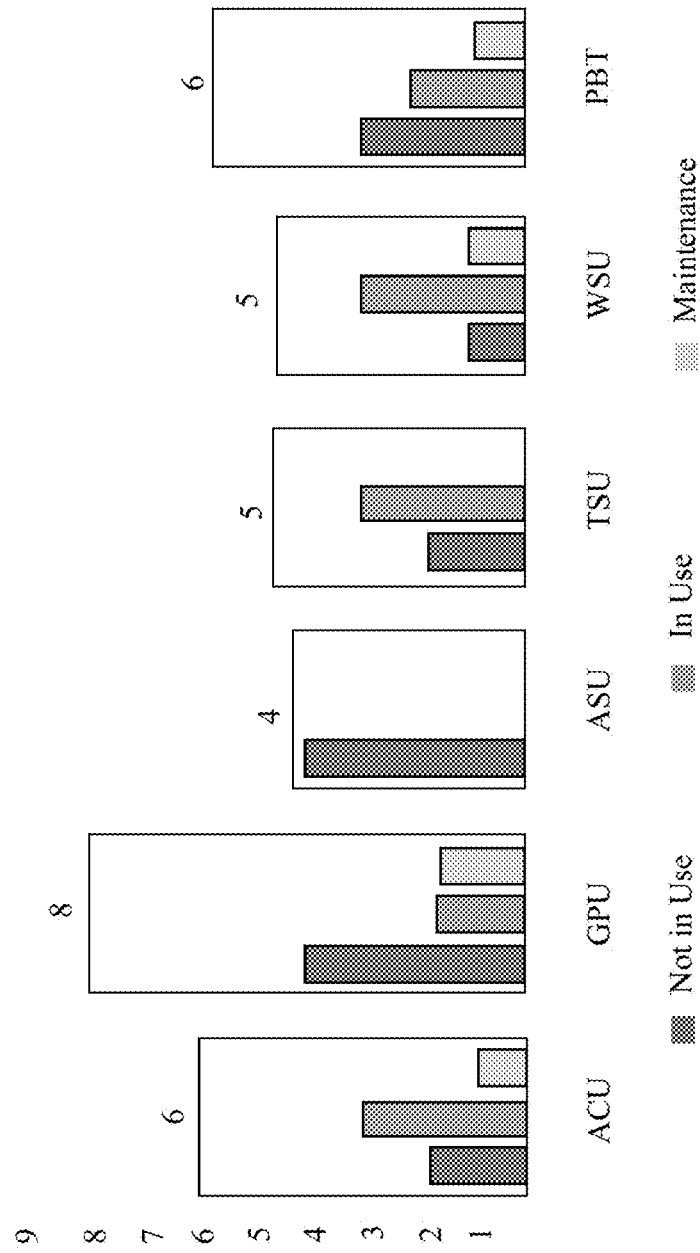

FIGS. 10A-10B exemplarily illustrate screenshots of graphical user interfaces (GUIs) 1001 and 1002 rendered by the operations management engine, displaying day of operations information, according to an embodiment herein. The operations management engine, in communication with the tracking devices and/or the operational systems, determines and displays day of operations information on the GUIs 1001 and 1002 in different configurations as exemplarily illustrated in FIGS. 10A-10B.

Figure 11A:
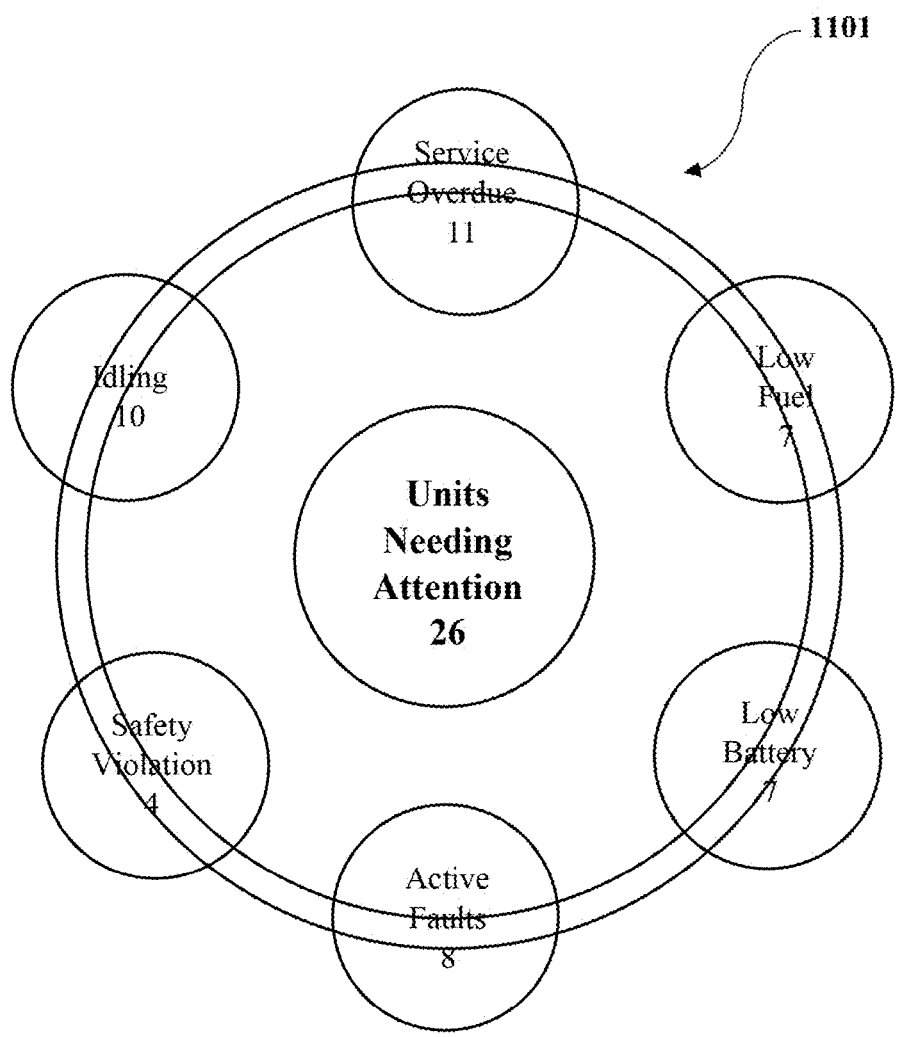
FIGS. 11A-11B exemplarily illustrate screenshots of graphical user interfaces rendered by the operations management engine, displaying number of units needing attention or action for optimizing ground handling operations, according to an embodiment herein.
Figure 11B:
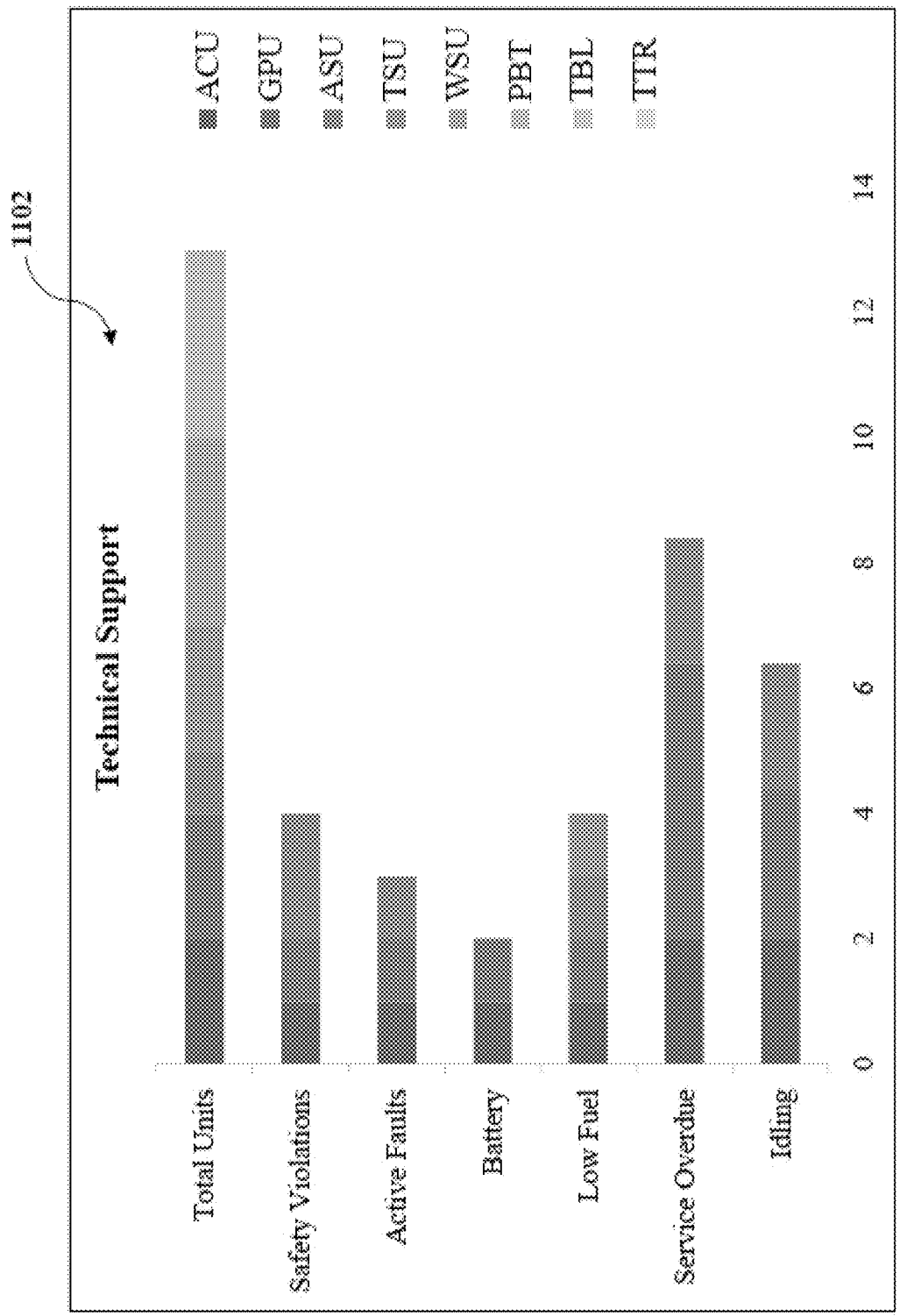

FIGS. 11A-11B exemplarily illustrate screenshots of graphical user interfaces (GUIs) 1101 and 1102 rendered by the operations management engine, displaying number of units needing attention or action for optimizing ground handling operations, according to an embodiment herein. The operations management engine, in communication with the tracking devices and/or the operational systems, determines and displays number of units needing attention or action on the GUI 1101 and 1102 in different configurations as exemplarily illustrated in FIGS. 11A-11B.

Figure 12A:
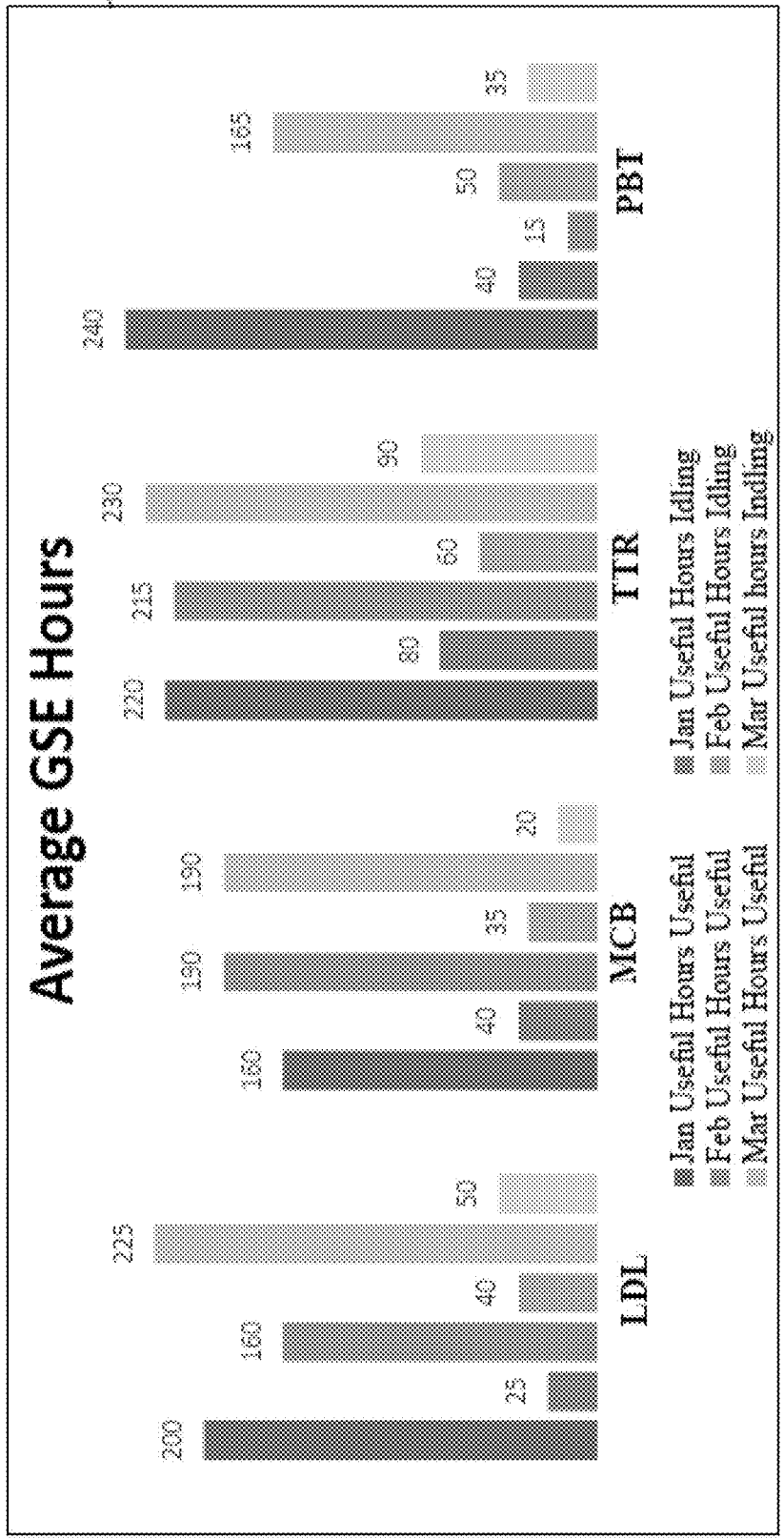
FIGS. 12A-12C exemplarily illustrate screenshots of graphical user interfaces rendered by the operations management engine, displaying data elements determined by the operations management engine for optimizing ground handling operations, according to an embodiment herein.
Figures 12B, 12C:
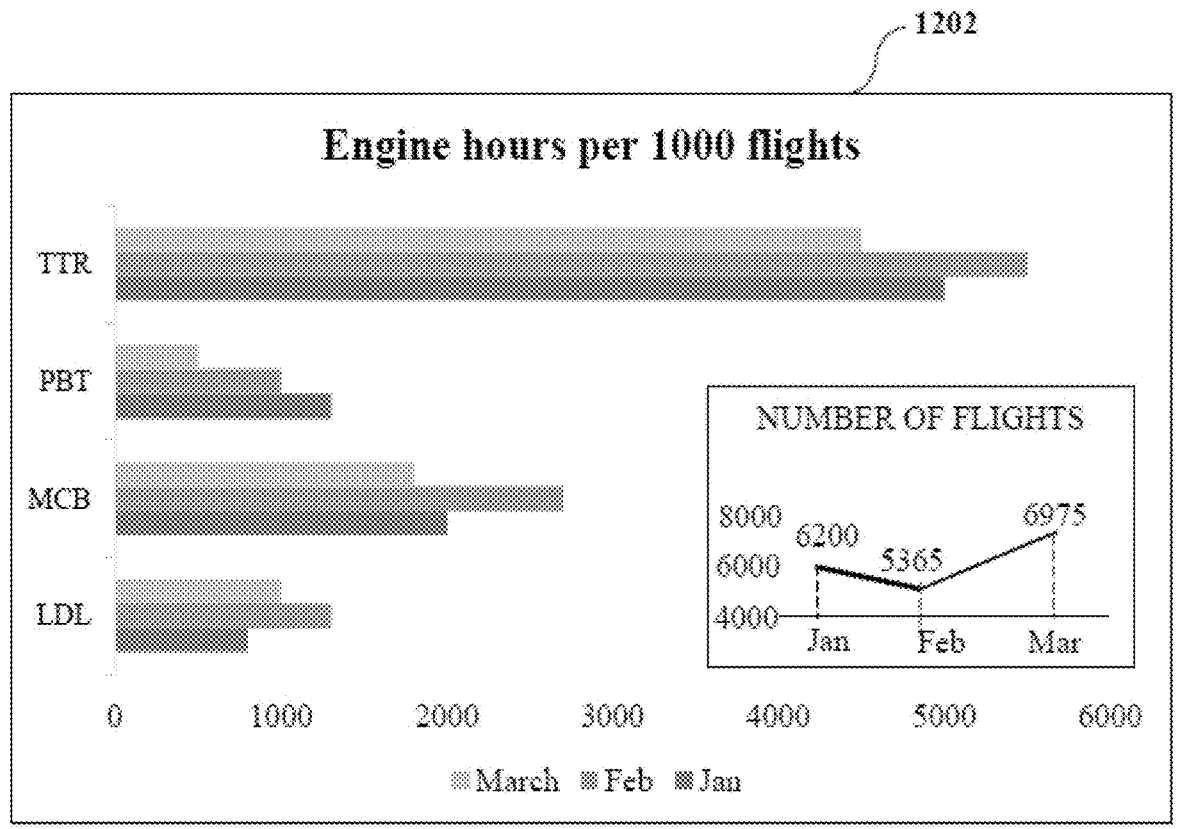

FIGS. 12A-12C exemplarily illustrate screenshots of graphical user interfaces (GUIs) 1201, 1202, and 1203 rendered by the operations management engine, displaying data elements determined by the operations management engine for optimizing ground handling operations, according to an embodiment herein. The operations management engine, in communication with the tracking devices and/or the operational systems, determines and displays data elements comprising, for example, average around support equipment (GSE) hours, engine hours per 1000 flights, and high and low utilization units on the GUIs 1201, 1202, and 1203 in different configurations as exemplarily illustrated in FIGS. 12A-12C.

The embodiments herein ensure consistent service delivery standards to turn around an aircraft safely in the shortest amount of time; reduce operating and maintenance costs to deliver highest benefit/cost ratio that is shared between stakeholders; and implement technology-driven solutions to optimally utilize capital-intensive resources such as ground support equipment (GSE). Moreover, the embodiments herein provide information availability for long term decision making on optimal fleet size and equipment allocation processes. Furthermore, the embodiments herein provide a single source of information about all the assets for visualizing and managing day of operations, thereby offering visibility on equipment operating status, reducing congestion on airport roads, optimizing fleet size, and ensuring safety of human resources, equipment, and the aircraft. Furthermore, the embodiments herein provide a single platform for monitoring both motorized or powered and non-motorized or non-powered equipment without the need for deployment of any additional infrastructure on the airport apron. The single platform renders operational efficiencies, enhanced safety and security, improved delivery standards, and reduced operational costs and carbon footprint reduction to all entities, for example, stakeholders and service providers using assets within a multi-entity environment, for example, an airport environment. For entities such as airlines, ground handling companies, and catering companies, the embodiments herein cause a reduction in unnecessary engine idling hours, a reduction in maintenance costs resulting from utilization-based maintenance, a reduction in engine hours and proactive maintenance, and a reduction in fuel consumption and carbon footprint. The embodiments herein provide a complete overview of asset utilization. Moreover, the embodiments herein cause fleet size optimization leading to GSE capital expenditure (capex) avoidance or deferment. Fleet size optimization allows avoiding or deferring of capex spend on GSE. Furthermore, the embodiments herein provide real-time clarity on the locations of the assets. For entities such as airport authorities and operators, the embodiments herein bring all mobile asset operations under a single platform, provide a single source for all mobile asset inventory, increase revenue, by adding value to operators, provide an understanding of mobile asset movement patterns, and enhance passenger experience with optimized aircraft turnaround. Moreover, the embodiments herein provide a complete visibility of all assets, for example, GSE and mobile assets on the airside. Furthermore, the embodiments herein ensure regulatory compliance is met at all times.

It is apparent in different embodiments that the various methods, algorithms, and computer-readable programs disclosed herein are implemented on non transitory, computer-readable storage media appropriately programmed for computing devices. The non-transitory, computer-readable storage media participate in providing data, for example, instructions that are read by a computer, a processor, or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor, or a similar device. The "non-transitory, computer-readable storage media" also refer to any medium capable of storing of encoding a set of instructions for execution by a computer, a processor, or a similar device and that causes a computer, a processor, or a similar device to perform any one or more of the steps of the methods disclosed herein. In an embodiment, the computer programs that implement the methods and algorithms disclosed herein are stored and transmitted using a variety of media, for example, the computer-readable media in various manners. In an embodiment, hard-wired circuitry or custom hardware is used in place of, or in combination with, software instructions for implementing the processes of various embodiments. Therefore, the embodiments are not limited to any specific combination of hardware and software, in another embodiment, various aspects of the embodiments disclosed herein are implemented in a non-programmed environment comprising documents created, for example, in a hypertext markup language (HTML), an extensible markup language (XML), or other format that render aspects of a GUI or perform other functions, when viewed in a visual area or a window of a browser program. Various aspects of the embodiments disclosed herein are implemented as programmed elements, or non-programmed elements, or any suitable combination thereof.

Where databases are described such as the database 201f illustrated in FIG. 3, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. In an embodiment, object methods or behaviors of a database are used to implement various processes such as those disclosed herein. In another embodiment, the databases are, in a known manner, stored locally or remotely from a device that accesses data in such a database. In embodiments where there are multiple databases, the databases are integrated to communicate with each other for enabling simultaneous updates of data linked across the databases, when there are any updates to the data in one of the databases.

The embodiments disclosed herein are configured to operate in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors that are adapted to communicate with the computers. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers. The embodiments disclosed herein are not limited to a particular computer system platform, processor, operating system, or network.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be executed and changes may be made thereto, without departing from the scope and spirit of the embodiments disclosed herein.

What is claimed is:

1. A system for managing operations and assets associated with a plurality of entities, the system comprising:
   a tracking device operably coupled to each of a plurality of assets, wherein the assets comprise motorized equipment, non-motorized equipment, machine assets, and mobile assets, and wherein the tracking device is configured to collect asset data from the each of the assets;
   one or more of a plurality of sensors operably coupled to one or more of the assets for measuring and monitoring a plurality of operating parameters of the one or more of the assets in real time;
   at least one processor in operable communication with the tracking device and the sensors;
   a non-transitory, computer-readable storage medium operably and communicatively coupled to the at least one processor and configured to store computer program instructions executable by the at least one processor; and
   an operations management engine configured to define the computer program instructions, which when executed by the at least one processor, cause the at least one processor to:
      dynamically receive the asset data from the tracking device and the operating parameters from the one or more of the sensors;
      dynamically determine a plurality of data elements of the each of the assets by processing logical combinations of the asset data and the operating parameters, wherein the data elements comprise location, asset status, operating status, operational capability, availability, asset proximity to asset requirement, health, fuel level, speed of movement, machine asset hours, utilization pattern, and operator behavior associated with the each of the assets;
      determine actions associated with the assets to be executed based on the determined data elements; and
      generate an interactive, graphical map interface configured to render a visual representation of the assets, a geography containing the assets, the operations associated with the assets, and the determined data elements in one or more of a plurality of visual configurations in real time for real-time monitoring and facilitating execution of the determined actions associated with the assets.

2. The system of claim 1, wherein the tracking device is one of: a tracking and telematics device operably coupled to the motorized equipment, and a wireless beacon tag attached to the non-motorized equipment, and wherein the wireless beacon tag is configured to be read by a tag reader for retrieving location data of the non-motorized equipment.

3. The system of claim 1, wherein the sensors comprise fuel level sensors, temperature sensors, tyre pressure sensors, proximity detection systems, impact sensors, and camera systems, and wherein the camera systems are configured to continuously capture images of an environment around the each of the assets for incident investigation, process audits, and an analysis of training needs.

4. The system of claim 1, wherein the operating parameters comprise (a) fuel level of the motorized equipment; (b) temperature of the assets; (c) tyre pressure of one or more of the assets; (d) proximity of the assets to external objects; and (e) damage to the assets.

5. The system of claim 1, further comprising a plurality of access control devices in operable communication with the operations management engine for providing authorized access to the assets, wherein the access control devices are configured to communicate with the operations management engine via a plurality of communication protocols for authorizing the access to the assets and facilitating behavior monitoring, audit logging, and investigation actions.

6. The system of claim 1, wherein the asset status comprises a power on/off status of the each of the assets, and wherein the operating status comprises one of availability, drive status, work status, standby status, service status, and any combination thereof, of the each of the assets.

7. The system of claim 1, wherein the determination of the actions associated with the assets comprises one or more of:
identifying optimal assets from among the plurality of assets to be allocated for tasks associated with the operations;
identifying value-added machine asset hours and non-value-added machine asset hours for reducing fuel consumption and maintenance costs while extending warranty periods;
identifying the location of any of the assets requiring refueling based on the fuel level of the any of the assets and in communication with a fuel management system, facilitating a proactive refueling operation to the identified location;
forecasting preventive maintenance intervals and executing maintenance planning and scheduling using the machine asset hours and the utilization pattern of the each of the assets, in communication with a maintenance management system; and
determining a maximum number of assets needed and used during peak operational periods for determining a fleet size needed to meet operational requirements.

8. The system of claim 1, wherein one or more of the computer program instructions, which when executed by the at least one processor, further cause the at least one processor to forecast a type and a count of each of the assets required to handle each of the operations along with a duration of engagement, a start time of the engagement, and an end time of the engagement using schedules, engagement standards, and a compatibility matrix defining machine types that the each of the assets is configured to service.

9. The system of claim 1, wherein one or more of the computer program instructions, which when executed by the at least one processor, further cause the at least one processor to compare an actual deployment of the each of the assets with a forecasted and planned allocation of the each of the assets for the each of the operations and generate a report highlighting variations resulting from the comparison for executing corrective actions.

10. The system of claim 1, wherein one or more of the computer program instructions, which when executed by the at least one processor, further cause the at least one processor to execute turnaround monitoring for confirming presence of the each of the assets allocated for the each of the operations at a required operational area at a required time and for confirming completion of the operations for billing the entities.

11. The system of claim 1, wherein one or more of the computer program instructions, which when executed by the at least one processor, further cause the at least one processor to create and manage geofences in an environment around the each of the assets, in communication with access control devices and the tracking device, to preclude unauthorized assets from entering the environment and to preclude unauthorized movement of the assets within the environment.

12. The system of claim 1, wherein one or more of the computer program instructions, which when executed by the at least one processor, further cause the at least one processor to automatically acquire fueling data comprising quantity of fuel dispensed to any of the assets and manage financial transactions associated with the fueling data, in communication with a fuel management system.

13. The system of claim 1, wherein one or more of the computer program instructions, which when executed by the at least one processor, further cause the at least one processor to trigger alerts associated with the data elements and the assets for notifying the entities to initiate proactive mitigation and recovery actions.

14. The system of claim 1, wherein one or more of the computer program instructions, which when executed by the at least one processor, further cause the at least one processor to electronically acquire and process billing information for operations external to standard service-level agreements, in communication with a billing management system.

15. The system of claim 1, wherein the visual representation rendered on the interactive, graphical map interface is configured to perform at least one of: (a) displaying detailed information on the data elements of the each of the assets; (b) allowing measurement of distance; (c) displaying geographic coordinates; (d) capturing and displaying routes used by the assets; (e) triggering playback of the visual representation; (f) configuring geofences for executing geofencing; (g) flagging discrepancies and issues correlated to the location of the each of the assets for facilitating proactive recovery actions; (h) performing selective assignment actions; (i) performing historical data analysis; (j) displaying real-time information on traffic patterns on roads to be traveled by the assets; and (k) displaying day operations, role-specific dashboards.

16. The system of claim 1, wherein the visual configurations in which the visual representation of the assets, the geography containing the assets, the operations associated with the assets, and the determined data elements are rendered comprise configurations by one or more of flight, gate, geofence locations, airline, asset type, fuel level, health status, asset identifier, individual assets, asset status, operating status, location, department, operator, ad hoc service provision, violations, operator behavior, faults, and maintenance.

17. The system of claim 1, wherein the assets and the determined data elements are rendered on the interactive, graphical map interface using predefined color-coded interface elements representative of monitored functions and statuses.

18. The system of claim 1, wherein the interactive, graphical map interface is deployable on a user device and configurable based on user roles and allocation of the assets for monitoring the assets in real time and initiating corrective actions on the assets.

19. The system of claim 1, wherein the operations management engine is configured to interface with a plurality of operational systems to render supplementary information associated with the assets on the interactive, graphical map interface, wherein the operational systems comprise an operations database, resource management systems, contracts and billing systems, and a training and operator licensing system.

20. The system of claim 1, wherein one or more of the computer program instructions, which when executed by the at least one processor, further cause the at least one processor to generate reports with key performance indicators on one or more of operator performance, operator behavior, the actions performed, operator productivity, and compliance to standards.

21. A method for managing operations and assets associated with a plurality of entities, the method comprising:
collecting asset data from each of a plurality of assets by a tracking device operably coupled to the each of the assets, wherein the assets comprise motorized equipment, non-motorized equipment, machine assets, and mobile assets;
measuring and monitoring a plurality of operating parameters of one or more of the assets in real time by one or more of a plurality of sensors operably coupled to the one or more of the assets;
dynamically receiving the asset data from the tracking device and the operating parameters from the one or more of the sensors by an operations management engine executable by at least one processor, wherein the at least one processor is in operable communication with the tracking device and the sensors;
dynamically determining a plurality of data elements of the each of the assets by the operations management engine by processing logical combinations of the asset data and the operating parameters, wherein the data elements comprise location, asset status, operating status, operational capability, availability, asset proximity to asset requirement, health, fuel level, speed of movement, machine asset hours, utilization pattern, and operator behavior associated with the each of the assets;
determining, by the operations management engine, actions associated with the assets to be executed based on the determined data elements; and
generating an interactive, graphical map interface configured to render a visual representation of the assets, a geography containing the assets, the operations associated with the assets, and the determined data elements in one or more of a plurality of visual configurations in real time by the operations management engine for real-time monitoring and facilitating execution of the determined actions associated with the assets.

22. The method of claim 21, wherein the tracking device is one of: a tracking and telematics device operably coupled to the motorized equipment, and a wireless beacon tag attached to the non-motorized equipment, and wherein the wireless beacon tag is configured to be read by a tag reader for retrieving location data of the non-motorized equipment.

23. The method of claim 21, wherein the sensors comprise fuel level sensors, temperature sensors, tyre pressure sensors, proximity detection systems, impact sensors, and camera systems, and wherein the camera systems are configured to continuously capture images of an environment around the each of the assets for incident investigation, process audits, and an analysis of training needs.

24. The method of claim 21, wherein the operating parameters comprise (a) fuel level of the motorized equipment; (b) temperature of the assets; (c) tyre pressure of one or more of the assets; (d) proximity of the assets to external objects; and (e) damage to the assets.

25. The method of claim 21, further comprising authorizing access to the assets and facilitating behavior monitoring, audit logging, and investigation actions by a plurality of access control devices in operable communication with the operations management engine, wherein the access control devices are configured to communicate with the operations management engine via a plurality of communication protocols.

26. The method of claim 21, wherein the asset status comprises a power on/off status of the each of the assets, and wherein the operating status comprises one of availability, drive status, work status, standby status, service status, and any combination thereof, of the each of the assets.

27. The method of claim 21, wherein the determination of the actions associated with the assets by the operations management engine comprises one or more of:
identifying optimal assets from among the plurality of assets to be allocated for tasks associated with the operations;
identifying value-added machine asset hours and non-value-added machine asset hours for reducing fuel consumption and maintenance costs while extending warranty periods;
identifying the location of any of the assets requiring refueling based on the fuel level of the any of the assets and in communication with a fuel management system, facilitating a proactive refueling operation to the identified location;
forecasting preventive maintenance intervals and executing maintenance planning and scheduling using the machine asset hours and the utilization pattern of the each of the assets, in communication with a maintenance management system; and
determining a maximum number of assets needed and used during peak operational periods for determining a fleet size needed to meet operational requirements.

28. The method of claim 21, further comprising forecasting a type and a count of each of the assets required to handle each of the operations along with a duration of engagement, a start time of the engagement, and an end time of the engagement by the operations management engine using schedules, engagement standards, and a compatibility matrix defining machine types that the each of the assets is configured to service.

29. The method of claim 21, further comprising comparing an actual deployment of the each of the assets with a forecasted and planned allocation of the each of the assets for the each of the operations and generating a report highlighting variations resulting from the comparison for executing corrective actions, by the operations management engine.

30. The method of claim 21, further comprising executing turnaround monitoring by the operations management engine for confirming presence of the each of the assets allocated for the each of the operations at a required operational area at a required time and for confirming completion of the operations for billing the entities.

31. The method of claim 21, further comprising creating and managing geofences in an environment around the each of the assets, by the operations management engine in communication with access control devices and the tracking device, to preclude unauthorized assets from entering the environment and to preclude unauthorized movement of the assets within the environment.

32. The method of claim 21, further comprising automatically acquiring fueling data comprising quantity of fuel dispensed to any of the assets and managing financial transactions associated with the fueling data, by the operations management engine in communication with a fuel management system.

33. The method of claim 21, further comprising triggering alerts associated with the data elements and the assets by the operations management engine for notifying the entities to initiate proactive mitigation and recovery actions.

34. The method of claim 21, further comprising electronically acquiring and processing billing information for operations external to standard service-level agreements by the operations management engine in communication with a billing management system.

35. The method of claim 21, wherein the visual representation rendered on the interactive, graphical map interface is configured to perform at least one of: (a) displaying detailed information on the data elements of the each of the assets; (b) allowing measurement of distance; (c) displaying geographic coordinates; (d) capturing and displaying routes used by the assets; (e) triggering playback of the visual representation; (f) configuring geofences for executing geofencing; (g) flagging discrepancies and issues correlated to the location of the each of the assets for facilitating proactive recovery actions; (h) performing selective assignment actions; (i) performing historical data analysis; (j) displaying real-time information on traffic patterns on roads to be travelled by the assets; and (k) displaying day operations, role-specific dashboards.

36. The method of claim 21, wherein the visual configurations in which the visual representation of the assets, the geography containing the assets, the operations associated with the assets, and the determined data elements are rendered comprise configurations by one or more of flight, gate, geofence locations, airline, asset type, fuel level, health status, asset identifier, individual assets, asset status, operating status, location, department, operator, ad hoc service provision, violations, operator behavior, faults, and maintenance.

37. The method of claim 21, further comprising interfacing the operations management engine with a plurality of operational systems to render supplementary information associated with the assets on the interactive, graphical map interface, wherein the operational systems comprise an operations database, resource management systems, contracts and billing systems, and a training and operator licensing system.

38. The method of claim 21, further comprising generating reports with key performance indicators on one or more of operator performance, operator behavior, the actions performed, operator productivity, and compliance to standards, by the operations management engine.

* * * * *